(12) United States Patent
Kashiwagi

(10) Patent No.: US 10,228,588 B2
(45) Date of Patent: *Mar. 12, 2019

(54) IMAGE SOURCE UNIT AND DISPLAY DEVICE

(71) Applicant: DAI NIPPON PRINTING CO., LTD., Tokyo-to (JP)

(72) Inventor: Tsuyoshi Kashiwagi, Tokyo-to (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/358,754

(22) Filed: Nov. 22, 2016

(65) Prior Publication Data

US 2017/0315403 A1    Nov. 2, 2017

Related U.S. Application Data

(63) Continuation-in-part of application No. 15/142,872, filed on Apr. 29, 2016.

(51) Int. Cl.
    *G02F 1/1335* (2006.01)
    *F21V 8/00* (2006.01)
(52) U.S. Cl.
    CPC ..... *G02F 1/133536* (2013.01); *G02B 6/0051* (2013.01); *G02B 6/0053* (2013.01);
    (Continued)
(58) Field of Classification Search
    CPC ......... G02F 1/133504; G02F 1/133528; G02F 1/133606
    See application file for complete search history.

(56) References Cited

U.S. PATENT DOCUMENTS

| 6,324,011 B1 | 11/2001 | Higuchi | |
|---|---|---|---|
| 2008/0252963 A1* | 10/2008 | Lee | G02B 5/208 359/350 |

(Continued)

FOREIGN PATENT DOCUMENTS

| JP | 2001-305312 | 10/2001 |
|---|---|---|
| JP | 2008-176059 | 7/2008 |

(Continued)

*Primary Examiner* — Kendrick Hsu
(74) *Attorney, Agent, or Firm* — Hamre, Schumann, Mueller & Larson, P.C.

(57) ABSTRACT

Provided is an image source unit including a layer including a light transmissive portion and an in-between portion, which can improve the use efficiency of light from a light source and improve the quality of display, including a liquid crystal panel and an optical sheet arranged on a lower polarizing plate side from the liquid crystal panel, wherein: the optical sheet includes a base material layer, an optical functional layer, and an adhesive layer; the optical functional layer includes a plurality of light transmissive portions having one extending direction along a face of the base material layer having a predetermined cross section, arranged in a different direction from the extending direction at predetermined intervals, and a plurality of in-between portions formed in the intervals of the adjacent light transmissive portions; and the lower polarizing plate and the optical sheet are adhered to each other by the adhesive layer.

15 Claims, 17 Drawing Sheets

(52) U.S. Cl.
CPC ..... *G02B 6/0055* (2013.01); *G02F 1/133504* (2013.01); *G02B 6/005* (2013.01); *G02B 6/0045* (2013.01); *G02F 2001/133531* (2013.01); *G02F 2202/28* (2013.01); *G02F 2203/01* (2013.01)

(56) References Cited

U.S. PATENT DOCUMENTS

2009/0296022 A1   12/2009  Lee et al.
2017/0059765 A1*   3/2017  Oshima ............... G02B 6/0053

FOREIGN PATENT DOCUMENTS

| | | |
|---|---|---|
| JP | 2010-117574 | 5/2010 |
| JP | 2010-217871 | 9/2010 |
| JP | 2011-501219 | 1/2011 |
| JP | 2016-033663 | 3/2016 |
| JP | 2016-038593 | 3/2016 |
| WO | 2009/052052 | 4/2009 |

* cited by examiner

IMAGE SOURCE UNIT AND DISPLAY DEVICE

TECHNICAL FIELD

This invention relates to image source units and display devices which provide images for observers.

BACKGROUND ART

In a display device such as a liquid crystal television, a surface light source device illuminates a liquid crystal panel which has image information, from the back face side of the liquid crystal panel. This makes the illuminating light pass through the liquid crystal panel to obtain the image information, and is emitted to the observer side, which makes it possible for observers to see images. On the other hand, the liquid crystal panel, because of its nature, has a limitation in light which can be effectively used. Therefore improvements for efficiently using light from the light source are demanded.

JP2010-217871A discloses an image source unit in which a surface light source, a prism sheet, an optical functional layer (a layer where light transmissive portions and light absorbing portions are alternately arranged), and a liquid crystal panel are layered in the order mentioned. This makes the directions of light entering the liquid crystal panel closer to the normal line of the panel face of the liquid crystal panel, whereby the use efficiency of the light is increased.

Japanese Unexamined Patent Application Publication No. 2011-501219 also discloses a structure in which a light source, a brightness enhancement film (a sheet where a plurality of prisms whose apexes face to the observer side are arranged), a reflection polarizing film, an LCF (a film where light transmissive portions and light absorbing portions are alternately arranged), a liquid crystal panel are arranged in the order mentioned. This makes it possible to make the direction of light emitted from the light source closer to the normal direction of the panel face of the liquid crystal panel, therefore it is said that the use efficiency of light can be increased. In addition, the light entered the LCF having a large angle to the panel face of the liquid crystal panel is absorbed by the light absorbing portions arranged in the LCF.

SUMMARY OF INVENTION

Technical Problem

However, the optical functional layers described in JP2010-217871A and Japanese Unexamined Patent Application Publication No. 2011-501219 (LCF in Japanese Unexamined Patent Application Publication No. 2011-501219) may absorb part of effective light because they have light absorbing portions as in-between portions, between light transmissive portions.

In addition, since the optical functional layer has stripe patterns by the light transmissive portions and the light absorbing portions. Therefore the optical functional layer sometimes causes moire interference fringes by the relationship with the pixels of the liquid crystal panel.

Considering the above problems, an object of this invention is to provide an image source unit that can improve use efficiency of light from light sources and can increase the quality of the screen, even though the unit has a layer including light transmissive portions and in-between portions. This invention also provides a display device including the image source unit.

Solution to Problem

Hereinafter this invention will be described.

A first aspect of this invention is an image source unit including: a liquid crystal panel including a lower polarizing plate, an upper polarizing plate, and a liquid crystal layer arranged between the lower polarizing plate and the upper polarizing plate; and an optical sheet arranged on the lower polarizing plate side from the liquid crystal panel, wherein: the optical sheet includes a base material layer, an optical functional layer arranged on one face of the base material layer, and an adhesive layer; the optical functional layer includes a plurality of light transmissive portions having one extending direction along a face of the base material layer and having a predetermined cross section, arrayed in a direction different from the extending direction at predetermined intervals, and an in-between portion(s) formed in each of the intervals of the adjacent light transmissive portions; and the lower polarizing plate of the liquid crystal panel and the optical sheet are adhered to each other by the adhesive layer.

The optical sheet of the image source unit may include a light diffuser between the optical functional layer and the lower polarizing plate.

As the light diffuser, a rough face may be provided on a face of the base material layer, the face of the base material layer forming an interface between the base material layer and the adhesive layer, and the base material layer and the adhesive layer may have a difference in refractive index.

As the light diffuser, light diffusing particles may be dispersed in the adhesive layer.

In the above-described image source unit, an angle formed by an extending direction of a transmission axis of the lower polarizing plate and the extending direction of the light transmissive portions may be no more than 41.7°, or may be 1° to 20°, in a front view of the liquid crystal panel.

The above-described image source unit may further include a reflection type polarizing plate, wherein an angle formed by an extending direction of a transmission axis of the reflection type polarizing plate and the extending direction of the light transmissive portions may be in no more than 41.7°, or may be 1° to 20°, in a front view of the liquid crystal panel.

In the above description, the optical sheet and the reflection type polarizing plate may be directly layered to each other.

The light transmissive portions of the above-described image source unit each may have a trapezoid cross section, and at the cross section, a lower base which is longer than an upper base may face to the liquid crystal panel side, and the upper base which is shorter than the lower base may face to the opposite side from the liquid crystal panel side.

A light-absorbing material may be contained in the in-between portion(s).

The above-described image source unit may further include an optical element layer, wherein the optical element layer may include a plurality of unit optical elements each having a cross section convex to the opposite side from the liquid crystal panel side and having one extending direction keeping the cross section, arrayed in a direction different from the extending direction.

In that case, an angle formed by the extending direction of the light transmissive portions and the extending direction of the unit optical elements may be no more than 10° in a front view of the optical sheet.

Here, a reflection type polarizing film may be arranged between the optical functional layer and the optical element layer.

A refractive index of the in-between portion(s) may be smaller than a refractive index of the light transmissive portions.

In addition, a layer which reflects light may be formed in the in-between portion(s), at interfaces between the in-between portion(s) and the light transmissive portions.

In addition, a light-absorbing material may be contained in the in-between portion(s).

The above-described image source unit may further include a light source arranged on a side to which the unit optical elements of the optical element layer of the optical sheet are convex.

It is also possible to provide display device in which the above-described image source unit is placed in a housing.

Advantageous Effects of Invention

According to this invention, it is possible to efficiently emit appropriate light, and at the same time to effectively absorb light that causes defects, to whereby improve the use efficiency of light.

DESCRIPTION OF EMBODIMENTS

Figure 1:
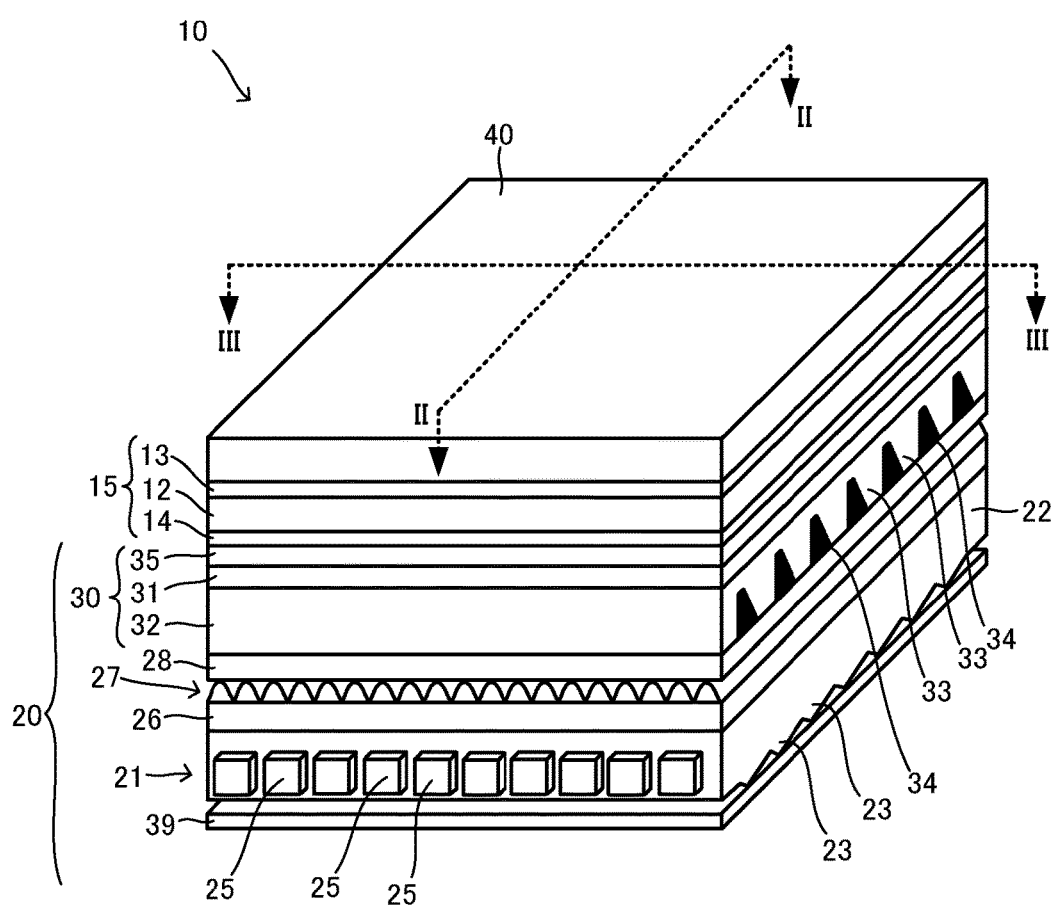
FIG. 1 is a perspective view showing an image source unit 10 according to a first embodiment.

Hereinafter this invention will be described based on the embodiments shown in the drawings. However, this invention is not limited to these embodiments. In each drawing shown below, sizes and shapes of members may be overdrawn for the purpose of easy understanding, and repeating symbols may be omitted for the purpose of easy reading.

Figure 2:
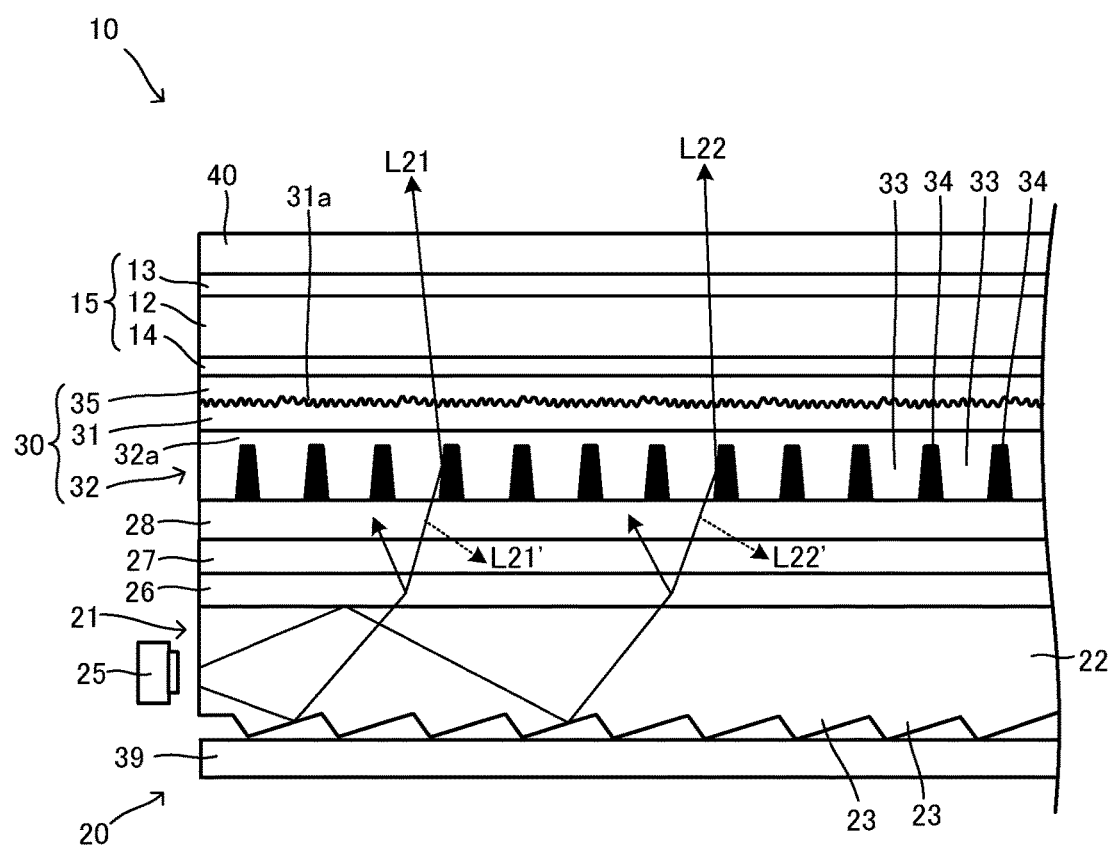
FIG. 2 is a cross-sectional view of the image source unit 10.
Figure 3:
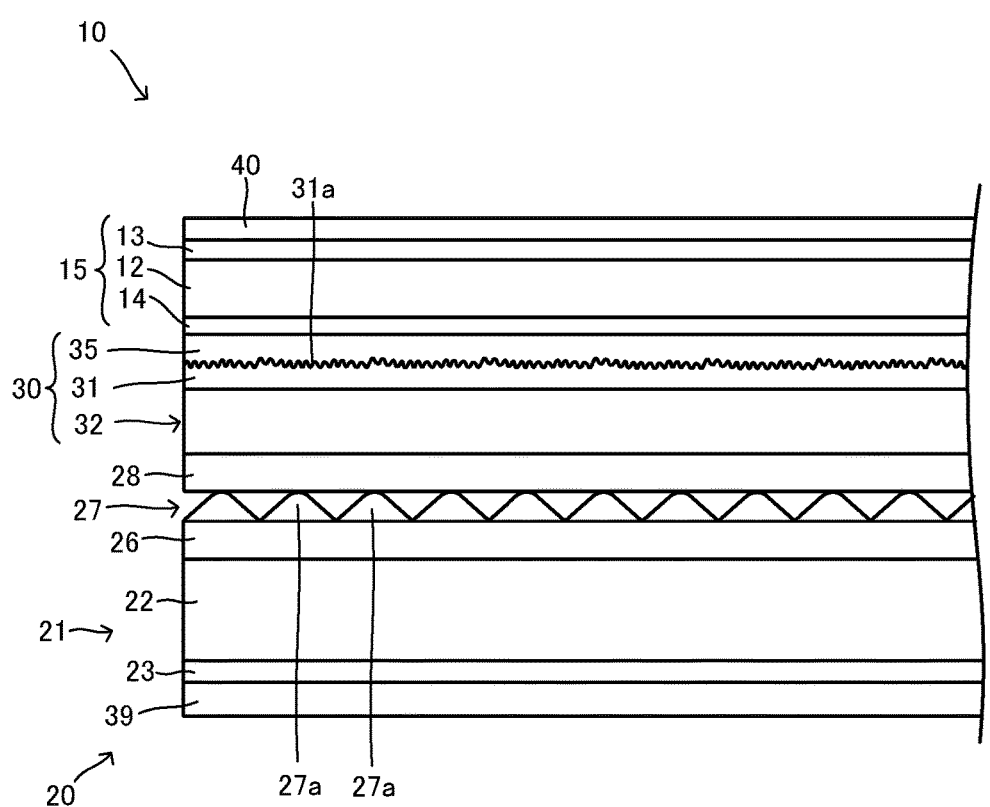
FIG. 3 is another cross-sectional view of the image source unit 10.

FIG. 1 is a view to explain a first embodiment, which is a perspective view of an image source unit 10 included in a display device. FIG. 2 shows a part of a cross-sectional view of the image source unit cut along the line shown by II-II in FIG. 1. FIG. 3 shows a part of a cross-sectional view of the image source unit 10 cut along the line III-III shown in FIG. 3. Other than the image source unit 10, the display device includes general devices needed for operating as a display device, such as a housing for placing the image source unit, a power source for activating the image source unit, and an electronic circuit for controlling the image source unit, whose descriptions are omitted. Hereinafter the image source unit 10 will be described.

The image source unit 10 includes a liquid crystal panel 15, a surface light source device 20, and a functional film 40. In FIG. 1, the upper side of the drawing sheet is the observer side.

The liquid crystal panel 15 includes an upper polarizing plate 13 that is a polarizing plate arranged on the functional film 40 side (observer side), a lower polarizing plate 14 that is a polarizing plate arranged on the surface light source device 20 side, and a liquid crystal layer 12 arranged between the upper polarizing plate 13 and the lower polarizing plate 14. The upper polarizing plate 13 and the lower polarizing plate 14 have a function to: divide incident light into two polarization components (P wave and S wave) that are orthogonal to each other; transmit the polarization component (for example, P wave) of one direction (a direction parallel to a transmission axis); and absorb the polarization component (for example, S wave) of the other direction (a direction parallel to an absorption axis) which is orthogonal to the above direction.

In the liquid crystal layer 12, a plurality of pixels are arranged in a vertical direction and horizontal direction along the layer face, and an electric field may be applied on a region to region basis, each region forming one pixel. The orientation of the liquid crystal layer 12 in which the electric field is applied varies. The polarization component (for example, P wave) parallel to the transmission axis transmitted through the lower polarizing plate 14 arranged on the surface light source device 20 side (that is, the light input side), rotates the polarization direction thereof by 90° C. when passing through the pixel in which the electric field is applied, whereas maintaining the polarization direction thereof when passing through the pixel in which the electric field is not applied. As such, based on whether the electric field is applied or not, it is possible to control whether the polarization component (for example, P wave) transmitted through the lower polarizing plate 14 is further transmitted through the upper polarizing plate 13 arranged on the light output side of the lower polarizing plate 14, or is absorbed and blocked by the upper polarizing plate 13.

In this way, the liquid crystal panel 15 has a structure for controlling, on a pixel to pixel basis, transmission or blocking of the light emitted from the surface light source device 20 to display an image.

The liquid crystal panel is configured to be capable of providing images to observers with this structure. Therefore, when lighting is provided from the back face side of the liquid crystal panel, it is possible to improve the use efficiency of light by bringing a lot of light having the polarization component parallel to the transmission axis of the lower polarizing plate to the lower polarizing plate and making the light pass through the lower polarizing plate.

Further, the liquid crystal panel has a good contrast of emitted light and efficiency (transmittance), for incident light from the normal direction of the liquid crystal panel, by its nature. However, regarding incident light having large angles to the normal direction of the liquid crystal panel, and observation by the observer from an oblique direction, the crystal panel has problems of low contrast and low efficiency (transmittance). That is, increasing incident light from the normal direction of the liquid crystal panel is also effective to increase the use efficiency of light.

The kind of the liquid crystal panel is not particularly limited, and a known types of liquid crystal panel can be used. For example, TN, STN, VA, MVA, IPS, OCB, and the like can be given.

Next, the surface light source device 20 will be described.

The surface light source device 20 is arranged across the liquid crystal panel 15 from the observer side. The surface light source device 20 is a lighting device for emitting planar lights to the liquid crystal panel 15. As can be seen from FIGS. 1 and 2, in this embodiment, the surface light source device 20 is configured as an edge light type surface light source device, including a light guide plate 21, a light source 25, a light diffusion layer 26, a prism layer 27, a reflection type polarizing plate 28, an optical sheet 30, and a reflection sheet 39.

As can be seen from FIGS. 1 and 2, the light guiding plate 21 includes a base portion 22 and back face optical element 23. The light guiding plate 21 is a member formed in a plate shape as a whole, formed by a material having a light transmitting property. In this embodiment, one plate face side of the light guiding plate 21, which is on the observer side, is formed as a smooth face. The other plate face side which is on the opposite side of the observer side is formed as a back face, where a plurality of back face optical elements 23 are arranged.

As the materials of the base portion 22 and the back face optical elements 23, various materials can be used. Materials widely used as materials for optical sheets to be included in display devices, having excellent mechanical properties, optical properties, stability, and workability, and available at a low price can be used. For example, thermoplastic resins such as polymer resins having alicyclic structures, methacrylate resins, polycarbonate resins, polystyrene resins, acrylonitrile-styrene copolymers, methyl methacrylate-styrene copolymers, ABS resins, and polyether sulfone; and epoxy acrylate-based or urethane acrylate-based reactive resins (e.g. ionizing radiation curable resin) can be given.

The base portion 22 is a portion to be the base of the back face optical element 23, formed in a plate shape having a predetermined thickness, in which light is guided.

The back face optical element 23 is a projected element formed on the back face side (opposite side from the side where the reflection type polarizing plate 28 is to be arranged) of the base portion 22, and formed in a triangular column shape in this embodiment. The back face optical element 23 is formed in a column shape whose ridge line of the projected apex extends in the horizontal direction of the drawing sheet of FIG. 1. The plurality of back face optical elements 23 are arrayed having predetermined pitches, in the direction orthogonal to the direction where the ridge line extends. The cross section of the back face optical element 23 in this embodiment is shaped in a triangle. However, the present invention is not limited to this, and the cross section can be in any shapes such as a polygonal shape, hemispherical shape, a part of a sphere, and a lens shape.

It is preferable that the direction where the plurality of back face optical elements 23 are arrayed is the light guiding direction. That is, the back face optical elements 23 are arrayed in a separating direction from the light source 25, and the ridge line of each back face optical element 23 extends parallel to the direction where a plurality of light sources 25 are arranged, or, if the light source 25 is one long light source, a direction where the light source extends.

In this specification, "triangular shape" includes not only exact triangular shapes, but also shapes having errors in forming and limitations in manufacturing technique. Similarly, terms used in this specification to identify other shapes and geometric conditions, for example, "parallel", "orthogonal", "oval", and "circle" is not limited to their exact meanings, but they shall be read including some degrees of errors with which similar optical functions can be expected.

The light guide plate 21 having the above-described structure can be manufactured by extrusion molding or by forming the back face element 23 on the base portion 22. As for the light guide plate 21 manufactured by extrusion molding, the base portion 22 and the back face optical element 23 may be integrally shaped. When the light guide plate 21 is manufactured by forming, the material of the back face optical element 23 may be same resin material as or not same as the material of the base portion 22.

Back to FIGS. 1 and 2, the light source 25 will be described. The light source 25 is arranged on one side of the side faces of the base portion 22 of the light guide plate 21, the side in the direction where the plurality of back face optical elements 23 are to be arrayed. The kind of the light source is not particularly limited, and the light source can be configured in various forms, for example, a fluorescent lamp such as a linear cold cathode tube, a point-like LED (light emitting diode), or an incandescent light bulb can be used. In this embodiment, the light source 25 is formed from a plurality of LEDs, and is configured such that the turning-on/off of each LED, and/or the brightness of each LED when turned on can be individually adjusted by a control device, which is not shown.

In this embodiment, one example where the light source 25 is arranged on one side face is shown. However, a structure where light sources are arranged on the opposite side face as well can also be taken. In that case, the shape of the back face optical element is formed according to known shapes.

Next, the light diffusion layer 26 will be described. The light diffusion layer 26 is a layer arranged on the light output side of the light guide plate 21, having a function to diffuse and emit the light entered the light guide plate 21. This increases more the uniformity of the light emitted from the light guide plate 21, which can make scars on the light guide plate 21 less distinct.

A known light diffusion layer can be used as a specific structure of the light diffusion layer. For example, a structure where a light diffusing agent is dispersed in a parent material can be given.

The prism layer 27 is, as can be seen from FIGS. 1 to 3, a layer arranged closer to the liquid crystal panel 15 than the light diffusion layer 26, including unit prism 27a convex to the liquid crystal panel 15 side. The unit prism 27a has a structure of extending in the light guiding direction of the light guide plate 21, having a predetermined cross section. In this embodiment, a plurality of unit prisms 27a are arranged in a direction (in this embodiment, a direction orthogonal to the light guiding direction in a planar view) different from the light guiding direction.

A known shape can be applied to the cross-sectional shape of the unit prisms of the prism layer, depending on necessary functions. Light can be further diffused, or condensed, by the shape.

Figure 4:
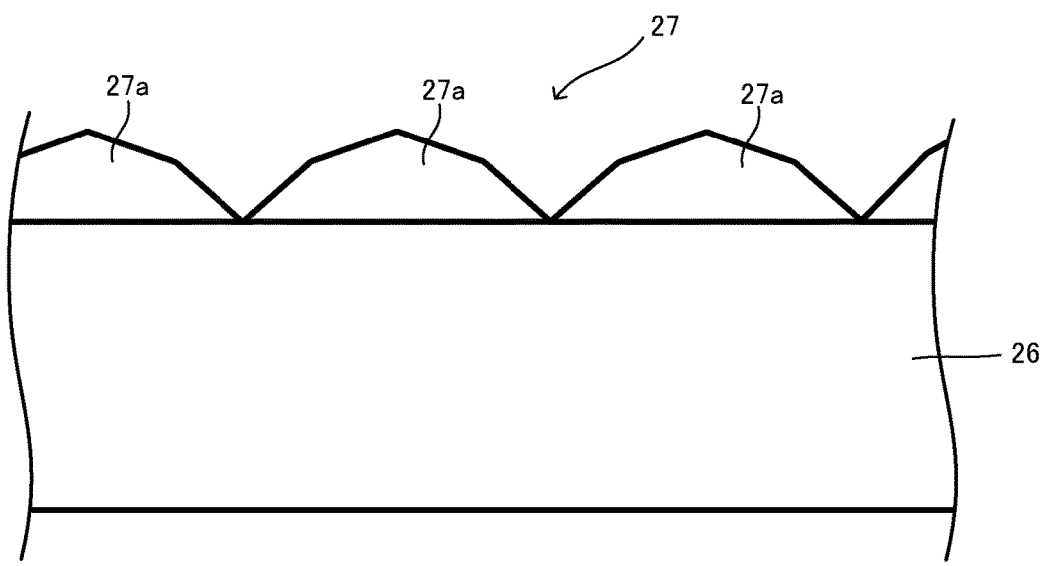
FIG. 4 is a view showing one embodiment of a prism layer 27.
Figure 5A:
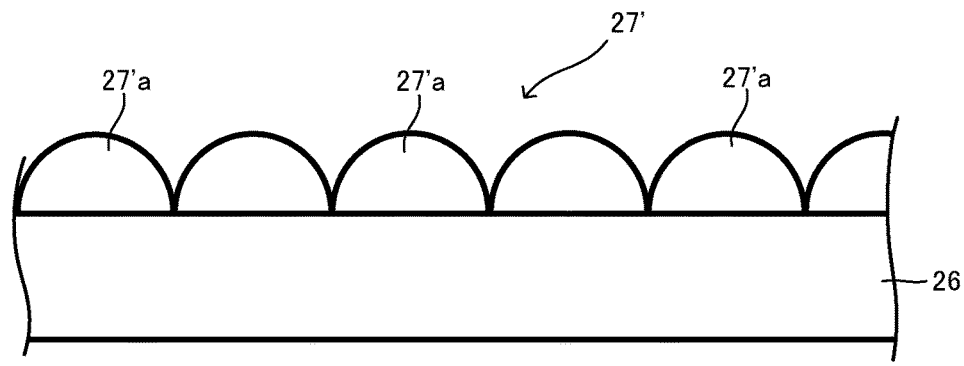
FIG. 5A is a view showing a prism layer 27'.
Figure 5B:
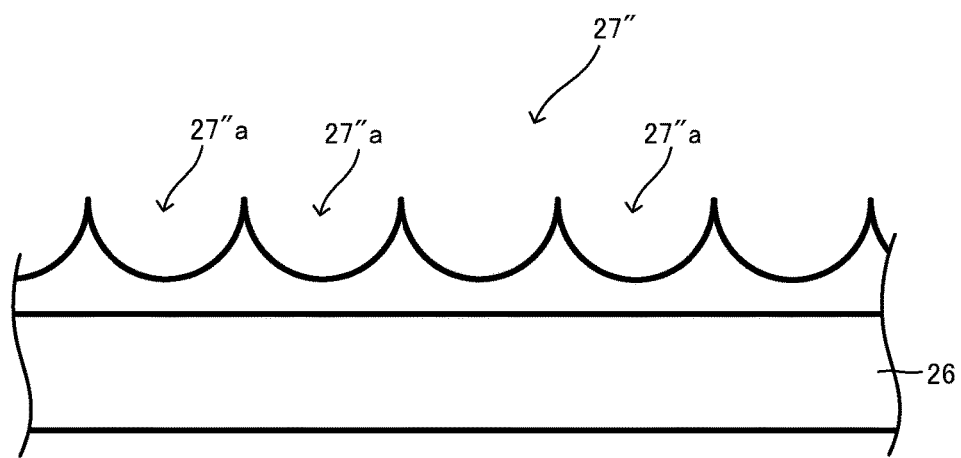
FIG. 5B is a view showing a prism layer 27"

For example, the unit prism can be structured as follows. FIGS. 4, 5A and 5B show views for explanation.

FIG. 4 shows an example where the unit prism 27a has a cross section formed in a pentagon prism shape.

FIG. 5A shows an example where a unit prism 27a' has a lenticular lens shape (convex cross section formed in a semicircular shape).

FIG. 5B shows an example where a unit prism 27"a has a concave cross section formed in a semicircular shape.

Next, the reflection type polarizing plate 28 will be described. The reflection type polarizing plate 28 has a function to: divide incident light into two polarization components (P wave and S wave) that are orthogonal to each other; transmit the polarization component (for example, P wave) of one direction (a direction parallel to a transmission axis); and absorb the polarization component (or example, S wave) of the other direction (a direction parallel to a reflection axis) which is orthogonal to the above direction. A known structure can be applied for the reflection type polarizing plate.

Here, the direction in which the transmission axis of the reflection type polarizing plate 28 extends is same as the direction in which the transmission axis of the above-described lower polarizing plate 14 extends, and can be at any angle of no more than 41.7° in a front view of the image source unit 1, to the direction in which the light transmissive portion 33 and the light absorbing portion 34 of the optical functional layer 32 described later extend. Preferably, this angle is 1° to 41.7°, more preferably 1° to 20°, and further preferably 1° to 5°. The angle of no more than 5° makes the viewing angle characteristics (balance between brightness and cutoff) especially good.

If this angle is no less than 0° and less than 1°, there is a high possibility that moire fringes form. Specifically, whiskers-like cut scraps easily form from the optical functional layer 32 in cutting because a side of an edge of the quadrilateral optical functional layer 32 is almost parallel to the direction where the light transmissive portion 33 and the light absorbing portion 34 extend.

Here, instead of the reflection type polarizing plate 28, the polarizing sheet 28' explained here may be used. Similar to the reflection type polarizing plate 28, the polarizing sheet 28' transmits the same polarized light as the polarized light that the lower polarizing plate transmits (for example, P wave), and reflects the other polarized light (for example, S wave). The structure of the polarizing sheet 28' is shown enlarged in FIG. 6. As can be seen from FIG. 6, the polarizing sheet 28' is formed from a transparent base material 28', a transparent uneven layer 28'b on the transparent base material 28'a, and a metal thin film 28'c having a predetermined thickness layered on a surface of the transparent uneven layer 28'b.

The transparent base material 28'a is a sheet member formed in a flat plate for supporting the transparent uneven layer 28'b and the metal thin film 28'c.

As the material of the transparent base material 28'a, various materials may be used. Materials widely used as materials for optical sheets to be included in display devices, having excellent mechanical properties, optical properties, stability, and workability, and available at a low price may be used. For example, polyethylene terephthalate resins (PET), triacetylcellulose resins (TAC), methacrylic resins, polycarbonate resins and the like may be given. Among them, TAC, methacrylic resins, and polycarbonate which have less refraction are preferably used, considering the combination with the lower polarizing plate.

Figure 6:
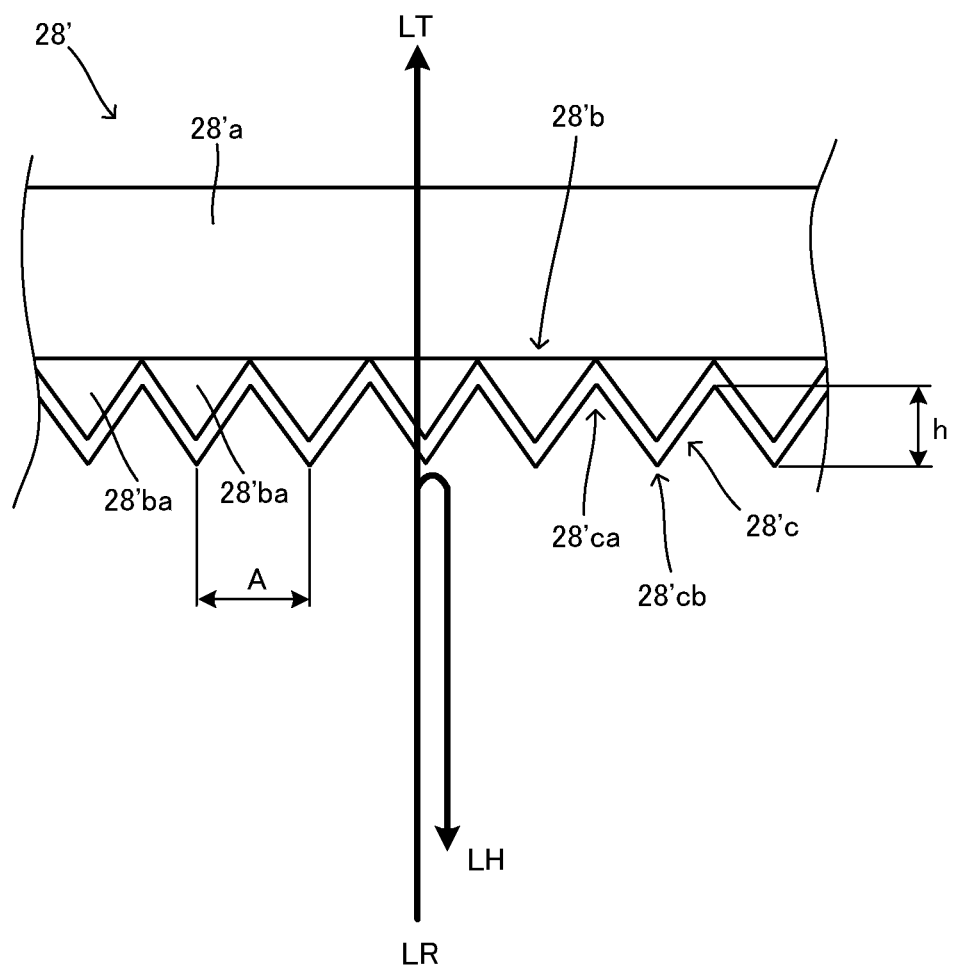
FIG. 6 is a view showing a light polarizing sheet 28'.

As for the transparent uneven layer 28'b, a unit convex portion 28'ba having a triangular shape at the cross section shown in FIG. 6 extends in a predetermined direction (direction orthogonal to the face of the drawing sheet of FIG. 6) along the face of the transparent base material 28'a, keeping the cross section. A plurality of unit convex portions 28'ba are arrayed in a direction orthogonal to the predetermined direction (direction in which the ridge line of each unit convex portion 28'ba extends).

As the material of the transparent uneven layer 28'b, for example ionizing radiation curable resins including ultraviolet curable resins such as epoxy acrylate based resin, urethane acrylate based resin, polyether acrylate based resin, polyester acrylate base resin, and polythiol acrylate based resin can be given.

The metal thin film 28'c is a layer formed from a thin film of metal such as aluminum, layered on the surface of the transparent uneven layer 28'b.

With this configuration, the polarizing sheet 28' includes a face in triangular wave shape formed from metal, repeating at a predetermined pitch A. The triangular wave shape is an uneven face, formed from groove lines 28'ca repeating at the predetermined pitch A in the horizontal direction of the drawing sheet of FIG. 6 and ridge lines 28'cb. The triangular wave shape extends in the direction orthogonal to the drawing sheet of FIG. 6.

When random polarization (natural polarization) LR enters the polarizing sheet 28' having the above structure, in a nearly vertical manner to the surface of the transparent base material 28'a, the component of linear polarization (S polarization) having an electric field vector, the vector oscillating parallel (direction orthogonal to the drawing sheet of FIG. 6) to the direction in which the groove lines 28'ca and the ridge lines 28'cb extend, emit polarization component in the same direction as the incident light, in order to oscillate electrons in the metal thin film 28'c, in a manner to be parallel to the groove lines 28'ca and the ridge lines 28'cb. As a result, the S polarization is reflected as reflection light LH (it is noted that the reflection light LH in FIG. 6 is an example of light path, which is conceptual). On the other hand, the component of linear polarization (P polarization) having an electric field vector, the vector oscillating in a direction (the arraying direction of the unit convex portions 28'ba, horizontal direction of the drawing sheet of FIG. 6) orthogonal to the extending direction of the groove lines 28'ca and the ridge lines 28'cb, the polarization component which cannot excite such oscillation of electrons, enters the metal thin film 28'c to reach the back face thereof and passes through the metal thin film 28'c as transmitted light LT. Then, when random polarization which is synthesized light of S polarization and P polarization enters the polarization sheet 28', it is possible to separate the light into the S polarization of reflection light and the P polarization of transmitted light.

Here, the direction in which the transmission axis of the polarizing sheet 28' extends (that is, the direction orthogonal to the direction in which the groove lines 28'ca and the ridge lines 28'cb extend, the direction in which the groove lines 28'ca and the ridge lines 28'cb are alternately arrayed) is same as the direction in which the transmission axis of the lower polarizing plate 14 extends, and can be at any angle of no more than 41.7° in the front view of the image source unit 10, to the direction in which the light transmissive portion 33 and the light absorbing portion 34 of the optical functional layer 32 described later extend. Preferably, this angle is 1° to 41.7°, more preferably 1° to 20°, and further preferably 1° to 5°. The angle of no more than 5° makes the viewing angle characteristics (balance between brightness and cutoff) especially good.

If this angle is no less than 0° and less than 1°, there is a high possibility that moire fringes form. Specifically, whiskers-like cut scraps easily form from the optical functional layer 32 in cutting because a side of an edge of the quadrilateral optical functional layer 32 is almost parallel to the direction where the light transmissive portion 33 and the light absorbing portion 34 extend.

It is preferred that the polarizing sheet 28' satisfy the following conditions. This makes it possible to efficiently divide light into S polarization and P polarization.

The interval (constant pitch) A (μm) between the adjacent groove lines 28'ca is preferably no more than 1 μm, and more preferably in the range of from 0.1 μm to 0.2 μm. The height h (μm) of the ridge line 28'cb to the groove line 28'ca is preferably no more than 1 μm, and more preferably in the range of from 0.2 μm to 0.4 μm. The thickness of the metal thin film 28'c in the direction vertical to the transparent material 28'a (thickness direction of the transparent base material 28'a) is preferably no less than 0.01 μm. If the thickness d of the metal thin film 28'c is thinner than 0.01 μm, the transmittance of S polarization gets large, whereby the extinction ratio degrades. Even if the thickness gets large, the thickness in the direction vertical to the oblique face of the projection of the metal thin film 28'c can be thin by making the height h to the pitch A large. Therefore, it is possible to provide a good extinction ratio of S polarization and P polarization. As such, the upper limit of the thickness of the metal thin film 28'c may not be set.

As the metal material which may be used for the metal thin film 28'c, aluminum (Al) whose refraction index is close to 0, and whose extinction coefficient is approximately 5, and according to these, gold (Au) and silver (Ag) are suitable.

Here, shown is an example in which the cross section of the unit convex portion 28'ba is triangle and therefore the cross section of the metal thin film 28'c is also triangle. However, the cross-sectional shape is not limited to this, and may be a rectangular shape, and may be in a shape including a carved line in a part or as a whole, such as semicircular and semi-elliptical shape.

The polarizing sheet 28' may be produced as follows for example. That is, firstly, an original plate is made. The original plate is a mold, on the surface of which the unevenness corresponding to the transparent uneven layer 28'b is formed. This unevenness may be formed by nano/micro cutting, lithography, two-luminous-flux interference exposure method and the like.

Next, a layered body in which an uncured ultraviolet curing resin is applied on one surface of the transparent base material 28'a is prepared. The ultraviolet curing resin side is pressed to the original plate, cured by ultraviolet, and removed from the original plate.

Then, aluminum is evaporated to the cured ultraviolet curing resin by vacuum vapor deposition.

As described above, the polarizing sheet 28' has a simple structure, therefore the sheet may be manufactured easier than conventional reflection type polarizing plates.

Next, the optical sheet 30 will be described. As is seen from FIGS. 1 to 3, the optical sheet 30 includes a base material layer 31 formed in a sheet shape, an optical functional layer 32 arranged on one surface of the base material layer 31 (in this embodiment, the face on the light guide plate 21 side), and an adhesive layer 35 arranged on the other side (face on the liquid crystal panel 15 side) of the base material layer 31.

As described later, this optical sheet 30 has a function (light condensing function) of changing the traveling directions of the light incident from the light input side to emit the light from the light output side, and intensively increasing the brightness in the front direction (normal direction). At this time, variations of the polarization component are inhibited, whereby it is possible to increase the use efficiency of light by these functions. Further, the optical sheet 30 has a function of absorbing light traveled having a large angle to the front direction (light absorbing function).

Figure 7:
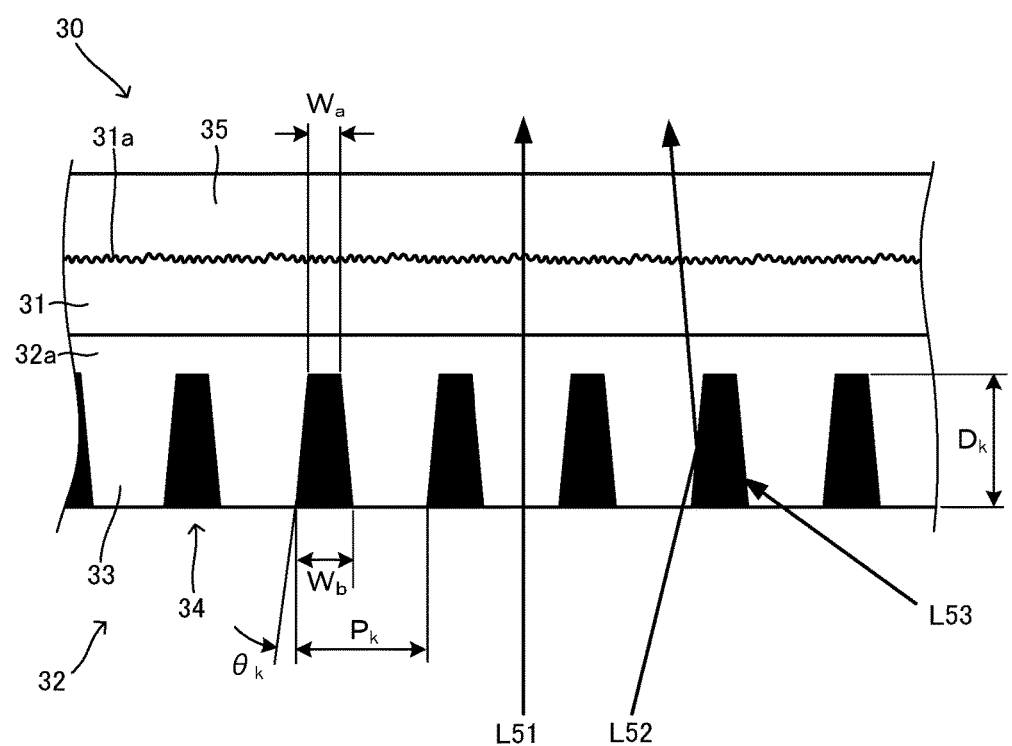
FIG. 7 is an enlarged view of a part of an optical sheet 30 of FIG. 2.

As shown in FIGS. 1 to 3, the base material layer 31 is a plate-like translucent member formed in a sheet, supporting the optical functional sheet 32 and the adhesive layer 35. FIG. 7 shows an enlarged view of a part of the optical sheet 30 in FIG. 2.

As the material of the base material layer 31, various materials may be used. Materials widely used as materials for optical sheets to be included in display devices, having excellent mechanical properties, optical properties, stability, workability and the like, and available at low costs may be preferably used. Examples thereof include polyethylene terephthalate resin (PET), triacetylcellulose resin (TAC), methacrylic resin, polycarbonate resin, and the like.

The retardation of the base material layer 31 is preferably small. Specifically, the front retardation when the wavelength is 590 nm is preferably no more than 15 nm. This makes it possible to transmit light through the lower polarizing plate without disturbing the state of polarization that has been arranged at the reflection type polarizing plate, to reduce the amount of the light absorbed by the lower polarizing plate, and to improve the use efficiency of the light. In view of this, among the above described materials that may be used for the base material layer 31, triacetylcellulose resin, methacrylic resin, and polycarbonate resin are preferably used. Further, for purposes that require a high heat resistance property such as on-vehicle use, polycarbonate resin which has a high glass transition point is desirable. Specifically, the glass transition point of polycarbonate resin is 143° C., which is suitable for on-vehicle use generally requiring durability at 105° C.

Further, an optical axis (slow axis) of the base material layer is desirably parallel to or perpendicular to the extending direction of the light absorbing portions in the front view. This makes it possible to suppress change in the state of polarization of the polarized light entering the optical sheet 30.

The thickness of the base material layer 31 is not particularly limited, and preferably in the range of from 25 μm to 300 μm. If the thickness of the base material layer 31 is out of the range, problems may cause in workability. For example, if the base material layer 31 is thinner than 25 μm, crinkles may easily occur, and if the base material layer is thicker than 300 μm, rolling up of the optical sheet 30 may get difficult.

As is seen from FIGS. 2, 3 and 7, a rough face 31a is formed on a face of the base material layer 31, the face being the opposite side from the face where the optical functional layer 32 is layered (that is, the face where the adhesive layer 35 is to be arranged). As described later, the rough face 31a functions as a light diffuser with the refractive index difference between the adhesive layer 35 and the base material layer 31. This makes it possible to inhibit occurrences of moire interference fringes. The degree of the surface roughness of the rough face 31a is not particularly limited, and preferably no less than 0.1 μm by average roughness (Ra). If the degree of the surface roughness is too small, the above-described effect to be obtained by the formation of the rough face gets small. On the other hand, in view of increase of light diffusion and reduction of the effect of controlling the light emitting range, the Ra is preferably no more than 1.5 m.

A known method can be applied to the method for forming the rough face 31a. Examples thereof include transcriptions by a roll where embosses are formed, sandblast, printing, and coating.

The optical functional layer 32 is a layer laminated on one surface (in this embodiment, the surface on the light guide plate 21 side) of the base material layer 31, on which the light transmissive portions 33 and the light absorbing portions 34 are alternately arrayed along the layer face.

The optical functional layer 32 has a shape extending from the back to the surface of the drawing sheet having the cross section shown in FIG. 7. That is, at the cross section shown in FIG. 7, the optical functional layer 32 includes the light transmissive portions 33 each having an approximately trapezoidal shape, and the light absorbing portions 34 each formed between two adjacent light transmissive portions 33, whose cross sections are each an approximately trapezoidal shape.

Figure 8:
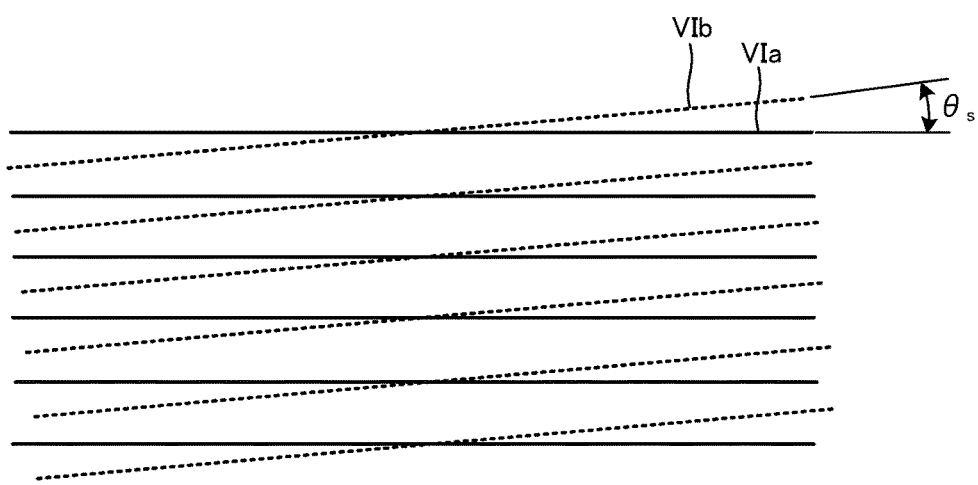
FIG. 8 is a view showing an angle $\theta_s$ formed by an extending direction of a light transmissive portion 33 and an extending direction of a transmission axis of a lower polarizing plate 14.

Here, as conceptually shown in FIG. 8, an angle $\theta_s$ formed by: the extending direction of the light transmissive portions 33 and the light absorbing portions 34, shown by a solid line VIa; and the extending direction of the transmission axis of the lower polarizing plate 14, shown by a dotted line VIb, is no more than 41.7°, preferably is 1° to 41.7° when the image source unit 1 is seen from the front direction on the observer side. This makes it possible to inhibit the variation of the polarization component by the reflection at the interfaces between the light transmissive portions 33 and the light absorbing portions 34, and to improve the transmittance ratio.

It is more preferable that $\theta_s$ be 1° to 20°. By having $\theta_s$ in this range, the variation of the transmittance ratio by the variation of $\theta_s$ gets small, which can reduce the variation of performance caused from the variation of $\theta_s$ in manufacturing. Whereby it is possible to provide an optical functional layer having a stable performance.

Most preferably, $\theta_s$ is 1° to 5°. The angle of no more than 5° makes the viewing angle characteristics (balance between brightness and cutoff) especially good.

If $\theta_s$ is no less than 0° and less than 1°, there is a high possibility that moire fringes form. Specifically, in view of manufacturing, whiskers-like cut scraps easily form from the optical functional layer 32 in cutting because a side of an edge of the quadrilateral optical functional layer 32 is almost parallel to the direction where the light transmissive portion 33 and the light absorbing portion 34 extend.

If this angle $\theta_s$ is 90°, the light reflected on the interface between the light transmissive portion and the light absorbing portion at this time is a polarized light along the absorption axis of the lower polarizing plate, which brings some fault of being absorbed.

The light transmissive portion 33 is a portion whose main function is to transmit light. In this embodiment, the light transmissive portion 33 is an element having an approximately trapezoidal cross sectional shape at the cross section shown in FIGS. 2 and 7, the approximately trapezoidal cross sectional shape having a longer lower base on the base material layer 31 side and a shorter upper base on the other side (light guide plate side). The light transmissive portions 33 extend in the above-described direction, keeping the cross sections along the layer face of the base material layer 31, and are arrayed having predetermined intervals in a different direction from the extending direction. Between adjacent light transmissive portions 33, an interval having an approximately trapezoidal cross section is formed. Therefore, the interval has a trapezoidal cross section having a longer lower base on the upper base side (light guide plate 21 side) of the light transmissive portion 33 and a shorter upper base on the lower base side (liquid crystal panel side) of the light transmissive portion 33. The light absorbing portion 34 is formed from a necessary material described later filled in the interval. In this embodiment, the adjacent light transmissive portions 33 are connected by a sill portion 32a at the longer lower base side.

The refractive index of the light transmissive portion 33 is made to be Nt. Such a light transmissive portion 33 may be formed by curing of a composition constituting the light transmissive portion. Details will be described later. The value of the refractive index Nt is not particularly limited, and preferably no less than 1.55 in view of properly reflecting light (including total reflection) at the interfaces between the light transmissive portions 33 and the light absorbing portions 34 at the oblique faces of the trapezoidal cross sections, which is described later. However, the refractive index is preferably no more than 1.61, because materials having too high refractive indexes tend to easily crack. More preferably, the index is no more than 1.56.

The light absorbing portion 34 functions as an in-between portion formed in the above-described interval formed between adjacent light transmissive portions 33, and has a similar cross sectional shape as that of the interval. Therefore, a shorter upper base faces the liquid crystal panel 15 side, and the longer lower base is on the light guide plate 21 side. The light absorbing portion 34 is formed in a manner that its refractive index is Nr and it can absorb light. Specifically, light absorbing particles are dispersed in a binder whose refractive index is Nr. The refractive index Nr is lower than the refractive index Nt of the light transmissive portion 33. By making the refractive index of the light absorbing portion 34 smaller than the refractive index of the light transmissive portion 33 as described above, it is possible to totally reflect the light entered the light transmissive portion 33 under predetermined conditions, properly at the interface between the light transmissive portion 33 and the light absorbing portion 34. Even if the conditions of total reflection are not satisfied, part of light is reflected at the interface.

The value of the refractive index Nr is not particularly limited, and preferably no more than 1.50 in view of properly making the total reflection. In the range, in view of availability, no less than 1.47 is preferable. More preferably it is no less than 1.49.

The difference between the refractive index Nt of the light transmissive portion 33 and the refractive index Nr of the light absorbing portion 34 is not particularly limited, and preferably in the range of from 0.05 to 0.14. By having a large refractive index difference, much light can be totally reflected.

Of the optical functional layer 32, though not particularly limited, the light transmissive portion 33 and the light absorbing portion 34 are formed in the following manner for example. That is, the pitch of the light transmissive portion 33 and the light absorbing portion 34, shown by $P_k$ in FIG. 7 is preferably in the range of from 20 μm to 100 μm. In addition, the angle formed by: the interface between the light absorbing portion 34 and the light transmissive portion 33 at an oblique side; and the normal line of the layer face of the optical functional layer 32, shown by $\theta_k$ in FIG. 7, is preferably in the range of from 1° to 10°. The thickness of the light absorbing portion 34 shown by $D_k$ in FIG. 7 is preferably in the range of from 50 μm to 150 μm. Within these ranges, a proper balance of the transmission and absorption of light is obtained in many cases.

In this embodiment, shown is an example in which the interface between the light transmissive portion 33 and the light absorbing portion 34 is in a straight line shape at the cross section. However, the shape is not limited to a straight line, and may by in a polygonal line shape, in a convex curved surface shape and in a concave curved surface shape. The cross sectional shapes of plurality of light transmissive portions 33 and the light absorbing portion 34 may be the same, and may be different having a predetermined regularity.

The adhesive layer 35 is a layer to attach the optical sheet 30 to the lower polarizing plate 14 by adhesion, and layer the optical sheet and the liquid crystal panel 15 (lower polarizing plate 14) without forming air interfaces between them. This makes it possible to improve the transmittance of light and increase the use efficiency of light. The attaching with adhesion creates no friction between the layers, which can prevent damages.

The material for the adhesive layer 35 is not particularly limited, and known adhesives, glues, photocurable resins, thermosetting resins, and the like may be used. As a more specific example, an acrylic adhesive may be used as the adhesive layer 35, and as a further specific example, a combined adhesive of an acrylic copolymer and an isocyanate compound may be given. However, the material for the adhesive layer 35 is preferably a material having good light transmissive property and weatherability, considering the nature of the optical sheet 30.

The thickness of the adhesive layer 35 is not particularly limited, and preferably in the range of from 25 μm to 50 μm. If the adhesive layer 35 is thinner than 25 μm, moires get easier to occur. If the thickness of the adhesive layer 35 is thicker than 50 μm, it gets difficult to roll up of the optical sheet 30, and dirt by protrusion of the adhesive from edges gets easily occur.

Here, it is preferable that the base material layer 31 and the adhesive layer 35 have a refractive index difference. This makes it possible to form a light diffuser by the rough face 31a and the refractive index difference, and to prevent occurrence of moire interference fringes. As a cause of the moire interference fringes, given is the interference fringe of the stripe pattern of the light absorbing portion 34 and the regular pattern of the pixels of the liquid crystal panel 15. Therefore, according to this embodiment, it is possible to inhibit degradation of the quality of the screen by the occurrence of such moire interference fringes.

The degree of the refraction index difference is not particularly limited, and preferably in the range of from 0.02 to 0.2. If the difference is less than 0.02, the effect of preventing moire interference fringes get small, and if the difference is more than 0.2, the effect of controlling light at the optical functional layer 32 may degrade and it may get difficult to obtain the material. The refraction index of the base material 31 may be larger than that of the adhesive layer 35, and the refraction index of the adhesive layer 35 may be larger than that of the base material layer 31.

According to the examination by the inventor, moire interference fringes did not occur when a polycarbonate of 130 μm in thickness and of 1.585 in refractive index was used as the base material layer 31, and an adhesive of 1.490 in refraction index (acrylic adhesive, PANACLEAN (registered trademark) PD-S1, manufactured by Panac Co., Ltd.) was used for forming an adhesive layer of 25 μm in thickness. Even under the environment of 95° C. for 1000 hours, peeling did not occur.

On the other hand, when an optical sheet was formed including an adhesive layer (acrylic adhesive, PANACLEAN (registered trademark) PD-S1 manufactured by Panac Co., Ltd., refractive index: 1.490) of 25 μm in thickness including a base material layer formed from polycarbonate (thickness: 130 μm, refractive index: 1.585) not having a rough face and light diffusing agent (acrylic styrene particles of 4 μm in average particle diameter and of 1.520 in refractive index) dispersed in the base material layer, it was possible to reduce moire interference fringes. Therefore, the light diffuser may be made also from an adhesive layer in which a light diffusing material is dispersed. As such, as a variation example, an adhesive layer in which a light diffusing material is dispersed may be layered on a base material not having a rough face.

In this example, however, the adhesive power tends to degrade.

As described above, in this invention, a light diffuser is provided between the optical functional layer 32 and the lower polarizing plate 14 where the optical sheet 30 is to be attached.

The optical sheet 30 is produced in the following manner for example.

First, the light transmissive portions 33 are formed on a face of the base material layer 31, the face where the rough face 31a is not formed. That is, a base material sheet to become the base material layer 31 is inserted in between a die roll having on its surface a shape that can transfer the shape of the light transmissive portions 33, and a nip roll arranged in a manner facing the die roll. At this time, the die roll and the nip roll are rotated while a composition for constituting the light transmissive portions is supplied in between the base material sheet and the die roll. Whereby, the composition for constituting the light transmissive portion is filled in grooves (a reversed shape of the light transmissive portions) formed on the surface of the die roll, which grooves corresponds to the light transmissive portions, and accordingly the composition becomes the surface shape of the die roll.

Here, as for the composition for constituting the light transmissive portions, ionizing radiation-curable resins such as epoxy acrylate-based, urethane acrylate-based, polyether acrylate-based, polyester acrylate-based, polythiol-based resins may be used.

The composition for constituting the light transmissive portions sandwiched between the die roll and the base material sheet and filled therein is irradiated with a light for curing, from the base material sheet side by a light irradiation apparatus. Whereby, the resin can be cured and the shape thereof can be fixed. Then, the base material layer 31 and the molded light transmissive portions 33 are released from the die roll by a mold release roll.

Next, the light absorbing portion 34 is formed. First, a composition for constituting the light absorbing portion is filled in a gap between the above formed light transmissive portions 33. Thereafter, the excessive amount of composition is scraped off by a doctor blade or the like. Then, the remaining composition is cured by an irradiation of light for curing from the light transmissive portion 33 side; and as a result, the light absorbing portion 34 can be formed.

The material to be used as the light absorbing portion is not particularly limited, and for example, a composition in which colored light absorbing particles are dispersed in a photocurable resin such as urethane(meth)acrylate, polyester(meth)acrylate, epoxy(meth)acrylate, and butadiene (meth)acrylate may be used.

Instead of dispersing the light absorbing particles, the whole light absorbing portion may be colored by a pigment or dye.

When the light absorbing particles are used, colored particles having a light absorbing property such as carbon black are preferably used. However, the light absorbing particles are not limited thereto. Colored particles which selectively absorb light with a certain wavelength in accordance with the properties of the image light may be employed. Specific examples include: carbon black, graphite, metal salts of black iron oxide and the like, organic particulates or glass beads colored by dye, pigment, and the like. Especially, the colored organic particulates are preferably used in view of costs, quality, availability, and the like. The average particle size of the colored particles is preferably in the range of from 1.0 µm to 20 µm.

Then, the adhesive layer 35 is formed by coating and the like, on a face of the base material layer 31, the face where the rough face 31a is formed.

In this manner, the optical sheet 30 is formed in which the optical functional layer 32 is layered on one face of the base material layer 31 and the adhesive layer 35 is layered on the other face where the rough face 31a is formed.

Back to FIGS. 1 to 3, the reflection sheet 39 of the surface light source device 20 will be described. The reflection sheet 39 is a member for reflecting the light emitted from the back face of the light guide plate 21 to make the light enter the light guide plate 21 again. As for the reflection sheet 39, a sheet that enables so-called specular reflection may be preferably employed, for example a sheet made of a material having high reflectance such as metal, or a sheet that includes as a surface layer, a thin film made of a material having high reflectance (for example, thin metal film).

The functional film 40 is a layer arranged on the light output side of the liquid crystal panel 15, having functions to improve the quality of image light, protect the image source unit 10, and the like. Example thereof include anti-reflection films, anti-glare films, hard coating films, color compensation films, light diffuser films and the like. These films are used alone or in combination to form the functional film 40.

Next, the functions of the display device having the above structure will be described showing examples of light paths. It is noted that the examples of the light paths are conceptualistic for explanation, not strictly showing the degrees of reflection and refraction.

First, the light emitted from the light source 25 enters the light guide plate 21 through the light input face on the side face of the light guide plate 21, as shown in FIG. 2. FIG. 2 shows, as one example, light paths of the lights L21 and L22 incident upon the light guide plate 21 from the light source 25.

As shown in FIG. 2, the lights L21 and L22 that have entered the light guide plate 21 repeat total reflection on the face on the light output side of the light guide plate 21 and the back face opposite thereto, due to the refractive index difference from the air; and travel in the light guiding direction (to the right of the drawing sheet of FIG. 2).

Here, the back face optical element 23 is arranged on the back face of the light guide plate 21. Therefore, as shown in FIG. 2, in some cases, the traveling directions of the lights L21 and L22 travelling through the light guide plate 21 are changed by the back face optical element 23, and thus the lights L21 and L22 enter the light output face and the face opposite thereto at an incident angle of less than a total reflection critical angle. In this case, the light may be emitted from the light output face and the face opposite thereto of the light guide plate 21.

The lights L21 and L22 emitted from the light output face travel to the reflection type polarizing plate 28 arranged on the light output side of the light guide plate 21. On the other hand, the light emitted from the back face is reflected by the reflection sheet 39 arranged on the rear face of the light guide plate 21; and enters again the light guide plate 21 to travel through the light guide plate 21.

The light travelling through the light guide plate 21 and the light that changed its direction at the back face optical element 23 and reaches the light output face having an incident angle less than a total reflection critical angle are created in each zone along the light guiding direction of the light guide plate 21. Therefore, the light travelling through the light guide plate 21 is emitted from the light output face little by little. This enables a uniform light amount distribution, along the light guiding direction of the light emitted from the light output face of the light guide plate 21.

The light emitted from the light guide plate 21 reaches the light diffuser layer 26 to increase its uniformity. Then, the light is diffused or collected as necessary by the prism layer 27, and emitted from the prism layer 27. The emitted light reaches next the reflection type polarizing plate 28. Here, the light in the polarizing direction along the transmission axis of the reflection type polarizing plate 28 transmits through the reflection type polarizing plate 28 and travels to the optical sheet 30.

On the other hand, the light in the polarizing direction along the reflection axis of the reflection type polarizing plate 28 is reflected and returns to the light guide plate 21 side, as shown by arrows of dotted lines L21' and L22' in FIG. 2. The returned light is reflected at the light guide plate 21, the back face optical element 23, or the reflection sheet 39, and travels again in the reflection type polarizing plate 28 side. In this reflection, part of the light changes its polarizing direction and passes through the reflection type polarizing plate 28. Other light returns again to the light guide plate side. In this way, by repeating the reflection, the light reflected at the reflection type polarizing plate 28 also can pass through the reflection type polarizing plate 28. This makes it possible to increase the use efficiency of the light from the light source 25.

Here, the light emitted from the reflection type polarizing plate 28, whose polarizing direction is a direction along the transmission axis of the lower polarizing plate 14, is a polarized light which passes through the lower polarizing plate 14.

The light emitted from the reflection type polarizing plate 28 enters the optical functional layer 32. The light which enters the optical functional layer 32, which is polarized light that passes through the lower polarizing plate 14, travels having the following light path. That is, as shown by L51 in FIG. 7 for example, the light passes through the light transmissive portion 33 without reaching the interface between the light transmissive portion 33 and the light absorbing portion 34. Or, as shown by L52 in FIG. 7, the light reaches the interface between the light transmissive portion 33 and the light absorbing portion 34 and is totally reflected to pass through the light transmissive portion 33. At this time, in this embodiment, the light reflected at the interface is made closer to the direction parallel to the normal line of the liquid crystal panel 15, by the function of the inclination angle ($\theta_k$) of the interface. In addition, even in light that is not totally reflected because it has a smaller angle than the critical angle of total reflection, part of the light is reflected at the interface. This kind of light also passes through the light transmissive portion 33.

This makes it possible to effectively provide, to the liquid crystal panel 15, light that does not cause defects such as deterioration of contrast and color inversion when the light passes through the liquid crystal panel 15. Further, the extending direction of the light transmissive portion 33 and the light absorbing portion 34 has an angle of no more than 41.7°, preferably 1° to 41.7°, and more preferably 1° to 20° in the front view, to the extending direction of the transmission axis of the lower polarizing plate 14. Therefore it is possible to inhibit the change of the polarization direction when the light is reflected or totally reflected at the interface. As such, it is possible to make a lot of light, which is totally reflected or reflected at the interface, pass through the lower polarizing plate 14. Therefore, it is possible to improve the use efficiency of light (light transmittance).

On the other hand, the light entered the optical functional layer 32 having a large angle to the normal line of the sheet face, is absorbed by the light absorbing portion 34, therefore the light is not provided to the liquid crystal panel 15. As such, it is possible to absorb light that causes defects such as contrast degradation and color inversion.

According to the optical sheet 30, it is possible to efficiently collect light from the light guide plate 21, and light that is not collected is absorbed by the light absorbing portion. Therefore it is possible to efficiently provide proper light to the liquid crystal panel, and to greatly improve the use efficiency of light. In addition, according to the optical sheet 30, it is possible to keep the polarizing direction of the light which is to be transmitted through the lower polarizing plate 14, when the light is provided to the lower polarizing plate 14. Therefore it is possible to inhibit light to be absorbed by the lower polarizing plate 14 and improve the use efficiency (transmittance) of light.

Light paths will be further explained. The light emitted from the surface light source device 20 as described above enters the lower polarizing plate 14 of the liquid crystal panel 15. The light passed through the optical functional layer 32 enters the lower polarizing plate 14 of the liquid crystal panel 15 via the adhesive layer 35, without going through any air layers. In this manner, in this embodiment, by having the adhesive layer 35, it is possible to make light directly enter the liquid crystal panel 15 without going through air interfaces. Therefore it is possible to inhibit light loss and to improve the use efficiency.

Of the incident light, the lower polarizing plate 14 transmits one of the polarization components and absorbs the other polarization component. The light transmitted through the lower polarizing plate 14 is selectively passes through the upper polarizing plate 13 in accordance with the state of the application of the electric field on each pixel. In this manner, the liquid crystal panel 15 selectively transmits the light from the surface light source device 20 on a pixel to pixel basis, thereby enabling the observer of the liquid crystal display device to observe the image. At this time, the image light is provided to the observer via the functional film 40, therefore the quality of image is improved.

In addition, in this embodiment, the rough face 31a is provided on the base material layer 31 of the optical functional layer 32, and there is a difference in the refractive index between the rough face 31a and the adhesive layer 35 layered on the rough face 31a. This makes it possible to prevent the occurrence of moire interference fringe and to obtain a high quality display.

An example in which the optical sheet 20 and the liquid crystal panel 15 are attached to each other by the adhesive layer 35 is shown above. Regarding other layers, they may be arranged having air layers therebetween as necessary, or they may be attached to one another by adhesive agents, or may be arranged to have contact with one another without having adhesive agents.

Figure 9:
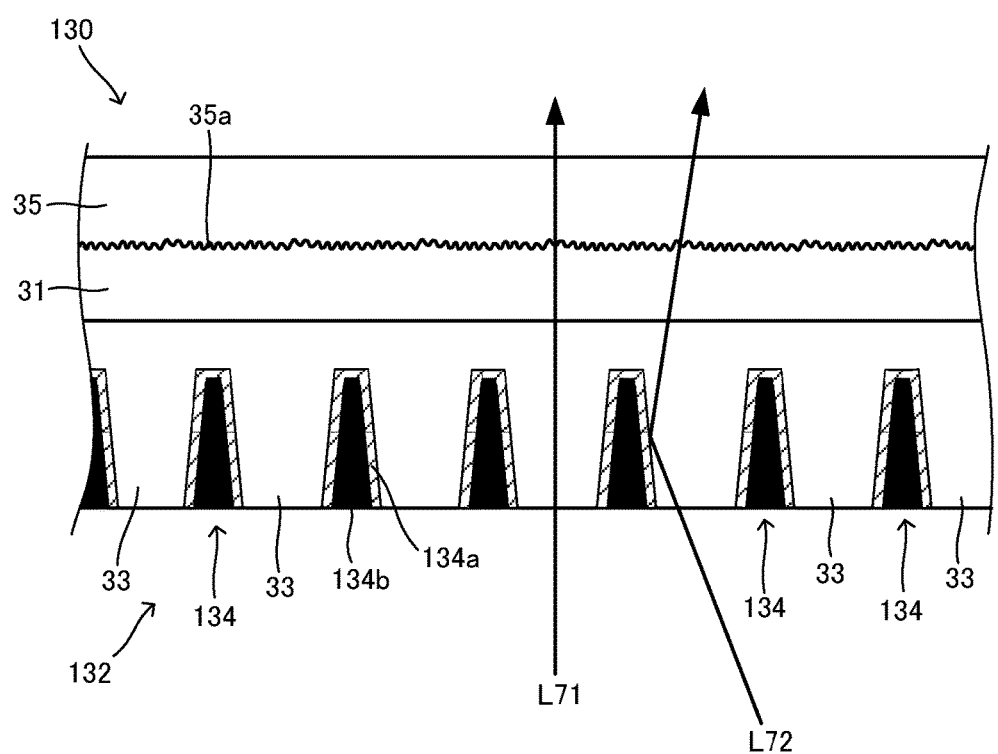
FIG. 9 is an enlarged cross-sectional view of a part of an optical sheet 130.

FIG. 9 is a view to explain a second embodiment, corresponding to FIG. 7. In this embodiment, an optical sheet 130 is applied instead of the optical sheet 30, and other structure is same as the above image source unit 10.

The optical sheet 130 includes the base material layer 31 like the optical sheet 30. However it has an optical functional layer 132 instead of the optical functional layer 32, which is a different point from the optical sheet 30. Specifically, in this embodiment, an in-between portion 134 arranged between the adjacent light transmissive portions 33 has a light reflection layer 134a at the interface with the light transmissive portion 33. In the in-between portion 134, a light absorbing portion 134b is formed at a portion between the light reflection layers 134a.

The light reflection layer 134a is a layer to reflect light, using reflection of the surface of metal or other materials, and formed in the in-between portion 134, at the interface between the in-between portion 134 and the light transmissive portion 33. The light reflection layer 134a may be formed by a vapor deposition film of aluminum, copper, silver, and the like.

The light absorbing portion 134b may be formed as in forming the above-described light absorbing portion 34.

According to such an optical functional layer 132, for example the light shown by L71 in FIG. 9 passes through the light transmissive portion 33 without reaching the interface between the light transmissive portion 33 and the in-between portion 134. Or, the light shown by L72 in FIG. 9 is reflected at the light reflection layer 134a even if the light reaches the interface between the light transmissive portion 33 and the in-between portion 134, and the light passes through the light transmissive portion 33. In this embodiment, the reflection is not by a total reflection. Therefore even light which does not satisfy the conditions of total reflection can be reflected at the light reflection layer 134a to be emitted. This makes it possible to emit more bright light.

Figure 10:
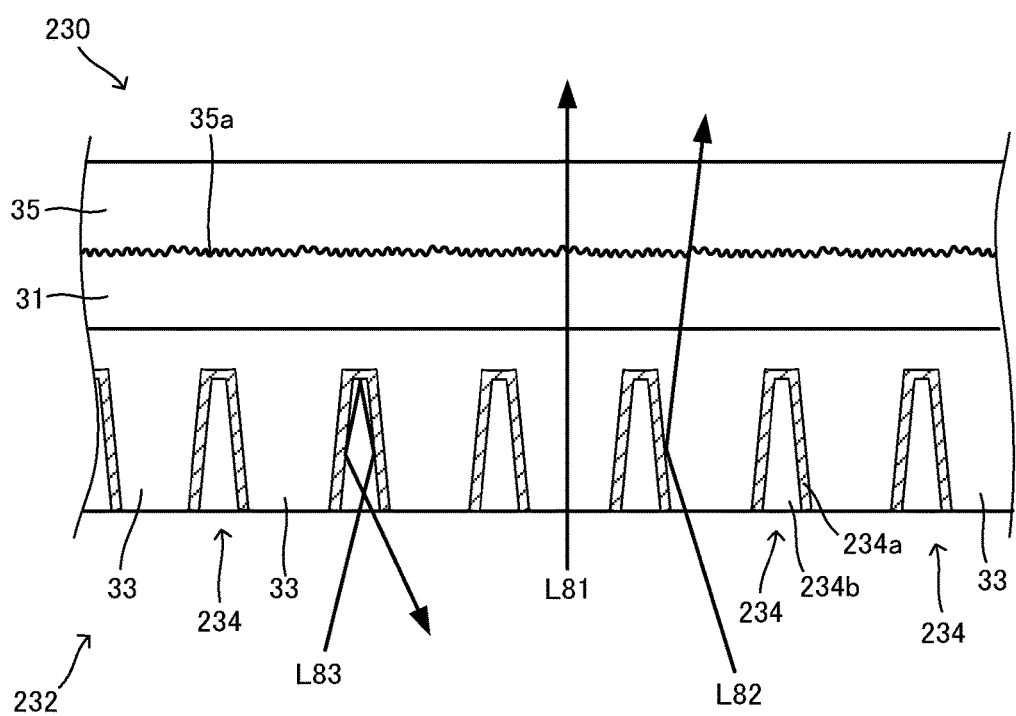
FIG. 10 is an enlarged cross-sectional view of a part of an optical sheet 230.

FIG. 10 is a view to explain a third embodiment, corresponding to FIG. 7. In this embodiment, an optical sheet 230 is applied instead of the optical sheet 30, and other structure is same as that of the image source unit 10.

The optical sheet 230 includes the base material layer 31 like the optical sheet 30. However, the optical sheet 230 includes an optical functional layer 232 instead of the optical functional layer 32, which is a different point from the optical sheet 30. Specifically, an in-between portion 234 arranged between the adjacent light transmissive portions 33 includes a light reflection layer 234a at the interface with the light transmissive portion 33. In the in-between portion 234, a transparent portion 234b is formed in a portion between the light reflection layers 234a.

The light reflection layer 234a is a layer to reflect light, using reflection of the surface of metal or other materials, and formed in the in-between portion 234, at the interface between the in-between portion 234 and the light transmissive portion 33. The light reflection layer 234a may be formed by a vapor deposition film of aluminum, copper, silver, and the like.

The transparent portion 234b may be formed by a hollow, or may be filled with a transparent resin, to transmit light.

According to such an optical functional layer 232, for example the light shown by L81 in FIG. 10 is transmitted through the light transmissive portion 33 without reaching the interface between the light transmissive portion 33 and the in-between portion 234. Or, the light shown by L82 in FIG. 10 is reflected at the light reflection layer 234a even if the light reaches the interface between the light transmissive portion 33 and the in-between portion 234, and the light is transmitted through the light transmissive portion 33. In this embodiment, the reflection is not by a total reflection. Therefore even light which does not satisfy the conditions of total reflection can be reflected at the light reflection layer 234a to be emitted. This makes it possible to emit more bright light.

Further, in the optical functional layer 232, the light entered the transparent portion 234b of the in-between portion 234 from the light input face side (the lower side of the drawing sheet of FIG. 10) is repeatedly reflected inside the in-between portion 234, and sent back to the light input face side. The returned light is reflected at other portions and returns again to the optical functional layer, to be used again. Therefore it is possible to provide further bright light.

Figure 11:
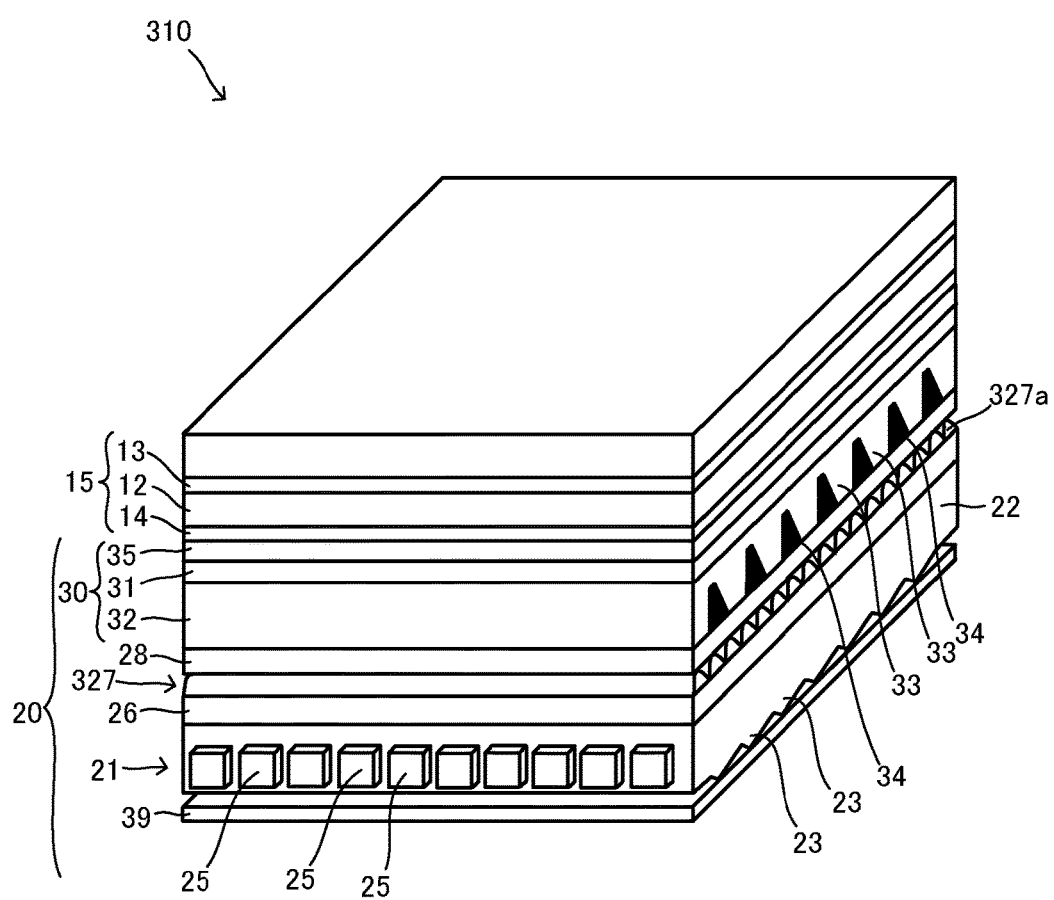
FIG. 11 is a cross-sectional view showing an images source unit 310.

FIG. 11 is a view showing a fourth embodiment, and is a perspective view of an image source unit 310. FIG. 11 corresponds to FIG. 1. The image source unit 310 is different from the image source unit 10 in that a prism layer 327 is arranged therein instead of the prism layer 27 included in the image source unit 10. The other structure is the same as the description above.

The prism layer 327 is, as can be seen from FIG. 11, arranged closer to the liquid crystal panel 15 than the light diffusion layer 26, including unit prisms 327a convex to the liquid crystal panel 15 side. Each unit prism 327a has a structure of extending in parallel to the direction where the light transmissive portions 33 and the light absorbing portions 34 of the optical functional layer 32 extend, having a predetermined cross section. The unit prisms 327a are arranged in a direction same as the direction where the light transmissive portions 33 are arranged.

A known shape can be applied to the cross-sectional shape of the unit prisms of the prism layer, depending on necessary functions. Light can be further diffused, or condensed, by the shape.

The optical functional layer 32, because of its nature, absorbs most of light that travels in the direction where the light transmissive portions 33 and the light absorbing portions 34 are alternately arranged, which easily reaches the interface between the light transmissive portions 33 and the light absorbing portions 34, and transmits most of light that travels in the direction where the light transmissive portions 33 extend, which is difficult to reach the interface between the light transmissive portions 33 and the light absorbing portions 34.

In contrast, the prism layer 327 can change the direction of light travelling in the direction where the unit prisms 327a are arranged (the light is directed in the direction of approaching the front in the case of condensation).

Thus, when the prism layer 327 is configured as an optical element that condenses light, the amount of light absorbed by the light absorbing portions 34, the light having been emitted from the prism payer 327, can be reduced and the use efficiency of the light can be improved by making the direction where the light transmissive portions 33 and the light absorbing portions 34 of the optical functional layer 32 extend parallel to the direction where the unit prisms 327a extend (making the direction where the light transmissive portions 33 and the light absorbing portions 34 are alternately arranged parallel to the direction where the unit prisms 327a are arranged).

As Examination Examples, the relationship between $\theta_s$ (°) and the transmittance (%) shown in FIG. 8 was obtained in simulation.

Examination Example 1

As Examination Example 1, the simulation was carried out on an image source unit corresponding to the image source unit 10 explained with reference to FIG. 1. One example of the structure of unit is as follows.

<Base Material Layer>
Thickness: 130 m
<Optical Functional Layer>
Pitch: 39 m ($P_k$ in FIG. 7)
Width of upper base of light absorbing portion: 4 μm ($W_a$ in FIG. 7)
Width of lower base of light absorbing portion: 10 μm ($W_b$ in FIG. 7)
Thickness of light absorbing portion: 102 μm (see $D_k$ in FIG. 7)
Thickness of optical functional layer: 127 μm
Refraction index of light transmissive portion: 1.56
Refraction index of light absorbing portion: 1.49
<Liquid Crystal Panel, Reflection Type Polarizing Plate, Light Guide Plate and Light Source>

A liquid crystal panel, reflection type polarizing plate, light guide plate and light source provided to a 6.5 inch liquid crystal display device (LQ065T5GG03, manufactured by SHARP CORPORATION) were used.

Figure 12:
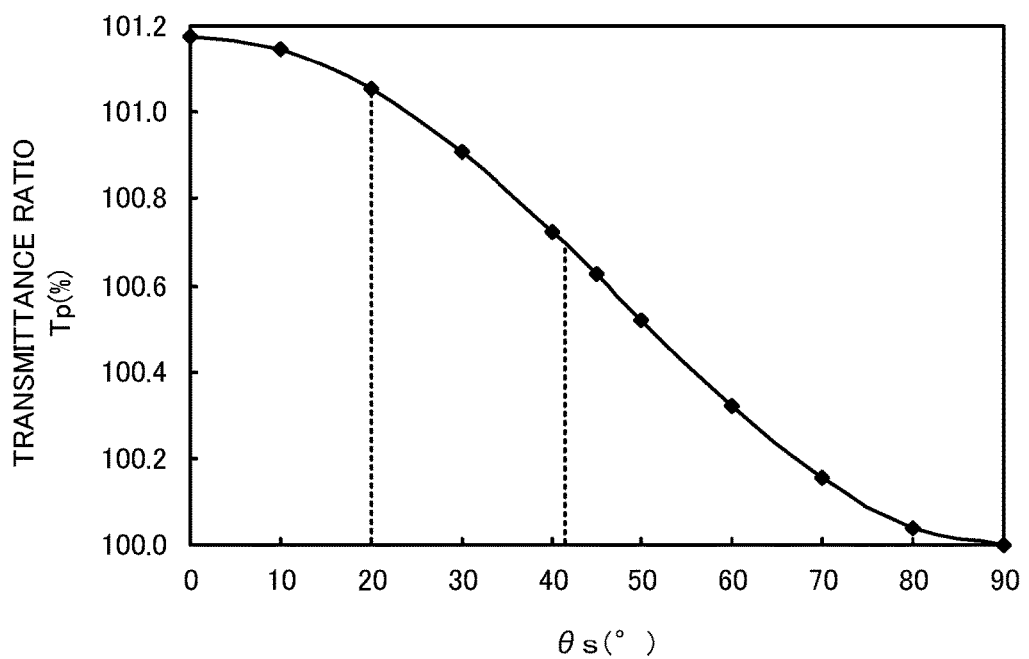
FIG. 12 is a graph showing a relationship between $\theta_s$ and a transmittance ratio $T_p$.

The results are shown in Table 1 and FIG. 12. In Table 1 and FIG. 12, the transmittance ratio $T_p$ is calculated from $$T_p = (T_1/T_0) \cdot 100 (\%)$$

wherein a value of transmittance $T_1$ at intended $\theta_s$ is expressed in percentage, setting the transmittance ratio $T_0$ where $\theta_s = 90°$ as 100%. In FIG. 12, $\theta_s$ is taken along the horizontal axis and the transmittance ratio $T_p$ is taken along the vertical axis.

TABLE 1

| $\theta_s$(°) | $T_p$(%) |
|---|---|
| 0 | 101.18 |
| 10 | 101.15 |
| 20 | 101.05 |
| 30 | 100.91 |
| 40 | 100.72 |
| 45 | 100.62 |
| 50 | 100.52 |
| 60 | 100.32 |
| 70 | 100.15 |
| 80 | 100.04 |
| 90 | 100.00 |

Based on this results, the obtained approximate formula is the formula (1) by a least-square method.

$$T_p = (4 \times 10^{-8}) \cdot \theta_s^3 - (5 \times 10^{-6}) \cdot \theta_s^2 + (3 \times 10^{-5}) \cdot \theta_s + 1.0117 \quad (1)$$

According to this, it is possible to make the transmittance ratio $T_p$ large by making $\theta_s$ smaller than 90°. However, in view of making the transmittance ratio more effectively large, preferably $\theta_s$ is smaller than the inflection point of the formula (1), which is, $0° \leq \theta_s \leq 41.7°$. Further, as is seen from FIG. 11, when $\theta_s$ is in the range of no more than 20°, the variation of the transmittance ratio $T_p$ is small compared to the variation of $\theta_s$, therefore it is possible to inhibit variation in the transmittance (performance) originated from the variation in manufacturing. Therefore, more preferably $\theta_s$ satisfies $0° \leq \theta_s \leq 20°$. As described above, in view of the problem of formation of moire fringes and manufacturing, further preferably $1° \leq \theta_s \leq 41.7°$, and further more preferably, $\theta_s$ satisfies $1° \leq \theta_s \leq 20.0°$.

In Examination Example 1, the result in one example is shown. However, image source units having other configuration such as the optical functional layer having another configuration showed similar tendency.

Examination Example 2-1

As Examination Example 2-1, an image source unit corresponding to the image source unit 10 described with reference to FIG. 1 was produced, and evaluations were carried out thereon. The specific shape was as follows.
<Base Material Layer>
Material and thickness: polycarbonate, thickness 130 μm
<Optical Functional Layer>
Pitch: 39 μm ($P_k$ in FIG. 7)
Width of upper base of light absorbing portion: 4 μm ($W_a$ in FIG. 7)
Width of lower base of light absorbing portion: 10 μm ($W_b$ in FIG. 7)
Thickness of light absorbing portion: 102 μm ($D_k$ in FIG. 7)
Thickness of optical functional layer: 127 μm
Material and refraction index of light transmissive portion: ultraviolet curable urethane acrylate of 1.56 in refraction index
Material and refractive index of light absorbing portion: ultraviolet curable urethane acrylate of 1.49 in refraction index, with 25 mass % of acrylic beads containing carbon black dispersed therein
<Liquid Crystal Panel, Reflection Type Polarizing Plate, Light Guide Plate and Light Source>
A liquid crystal panel, reflection type polarizing plate, light guide plate and light source provided to a 6.5 inch liquid crystal display device (LQ065T5GG03, manufactured by SHARP CORPORATION) were used.
<Arrangement>
The layers were arrayed in the order shown in FIG. 1, and the extending direction of the light transmissive portion and the light absorbing portion of the optical sheet, and the extending direction of the transmission axes of the reflection type polarizing plate and the lower polarizing plate were coincided with each other (that is, $\theta_s = 0°$ in FIG. 8).

Examination Example 2-2

Examination Example 2-2 was same as Examination Example 2-1, except that $\theta_s$ was changed to 10°.

Examination Example 2-3

Examination Example 2-3 was same as Examination Example 2-1, except that $\theta_s$ was changed to 90°.

Examination Example 2-4

Examination Example 2-4 was same as Examination Example 2-1, except that $\theta_s$ was changed to 45°.

A light source was turned on for each of the image units described above, and the brightness was measured from the front (automatic goniophotometer, GP-500, manufactured by MURAKAMI COLOR RESEARCH LABORATORY CO., Ltd.). Setting the brightness of the Examination Example 2-3 ($\theta_s = 90°$) as 100%, brightness of other examples were shown as percentages (brightness ratio). The value of the brightness corresponded to the transmittance ratio $T_p$.

As a result, the brightness ratio of Examination Example 2-1 was 100.5%, the brightness ratio of Examination Example of 2-2 was 100.4%, and the brightness ratio of Examination Example 2-4 was 100.3%. The absolute values were different since the conditions were not exactly same as that of Examination Example 1. However, the same tendency was able to be obtained from the results of Examination Examples 2-1 to 2-4, as that of Examination Example 1.

Figure 13:
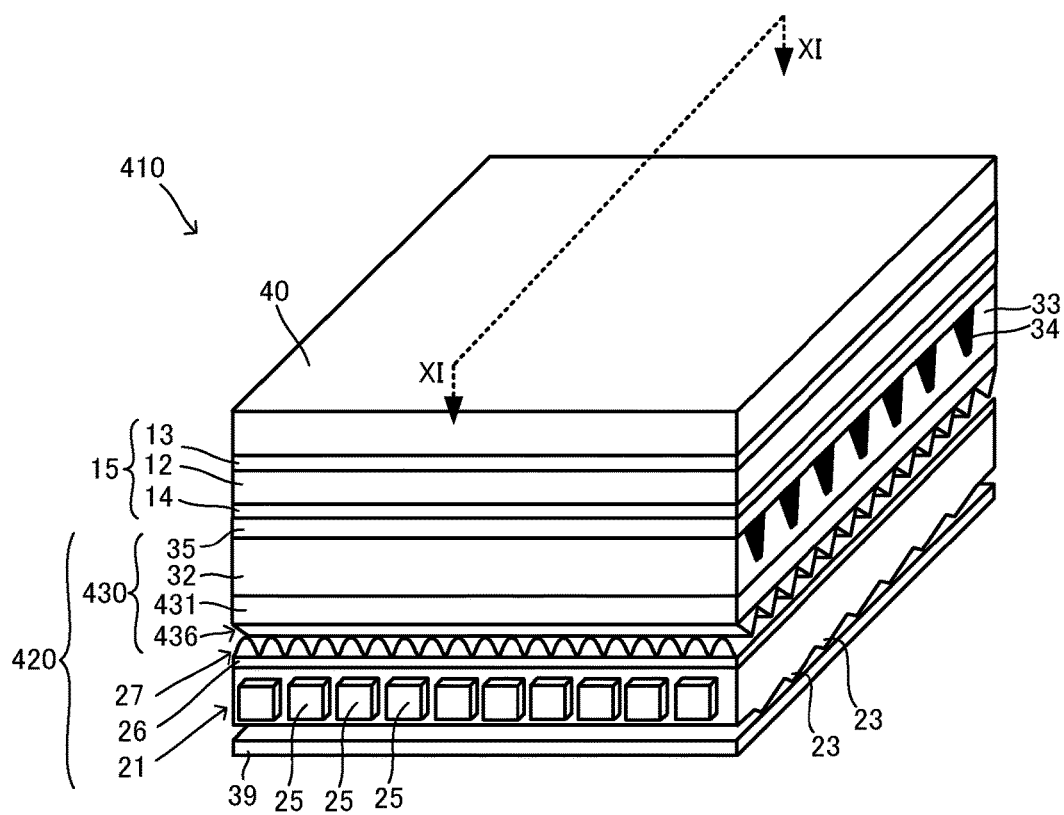
FIG. 13 is a perspective view showing an image source unit 410.

It is noted that moire fringes were observed in Examination Example 2-1. FIG. 13 is a view showing a fifth embodiment, and is a perspective view showing an image source unit 410 included in a display device. Other than the image source unit 410, the display device includes normal devices needed for functioning as a display device, such as a housing to accommodate the image source unit 410, a power source to operate the image source unit 410, and an electronic circuit to control the image source unit 410, whose descriptions are omitted. Hereinafter the image source unit 410 will be explained.

The image source unit 410 includes the liquid crystal panel 15, a surface light source device 420, and the functional film 40. In FIG. 13, the upper side of the drawing sheet is the observer side. To the liquid crystal panel 15 and the functional film 40, the same symbols as in the above-described image source unit 10 are used, and the explanations thereof are omitted, because they are same as in the image source unit 10 described above.

Figure 14:
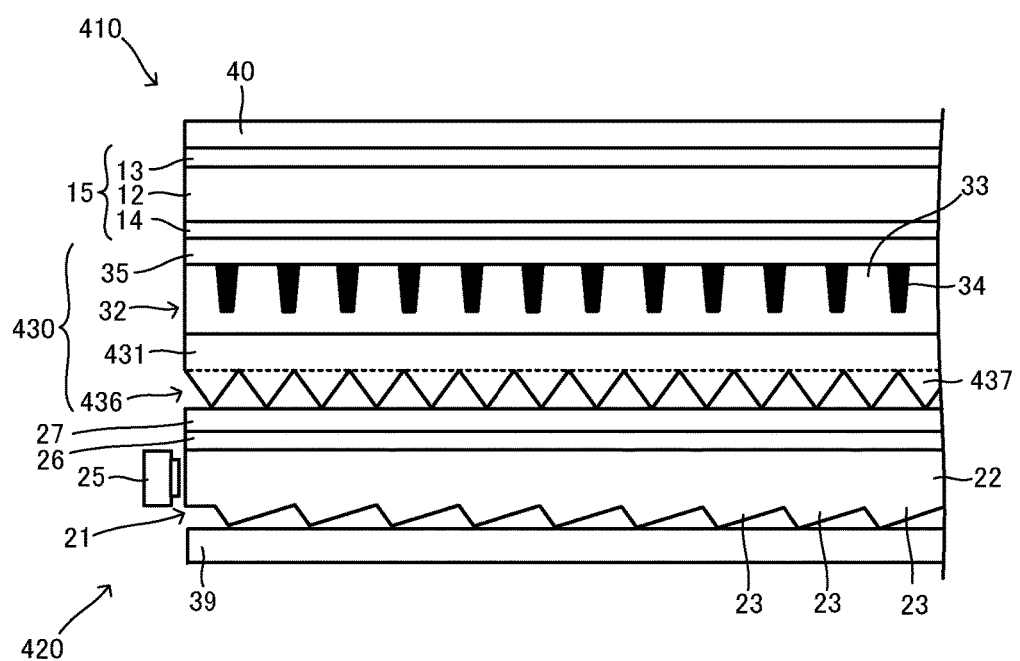
FIG. 14 is a cross-sectional view of the images source unit 410.

Next, the surface light source device 420 will be described. FIG. 14 shows a part of a cross-sectional view of the image source unit 410 cut along the line shown by XI-XI in FIG. 13.

The surface light source device 420 is a lighting device arranged on the opposite side from the observer side, which emits planer light to the liquid crystal panel 15. As is seen from FIGS. 13 and 14, the surface light source device 420 of this embodiment is also configured as an edge light type surface light source device, including a light guide plate 21, a light source 25, a light diffusion layer 26, a prism layer 27, an optical sheet 430, and a reflection sheet 39. Among them, to the components except the optical sheet 430, same symbols are used and explanations thereof are omitted, since they are the same as in the surface light source device 20 described above.

Next, the optical sheet 430 of this embodiment will be described. As can be seen from FIGS. 13 and 14, the optical sheet 430 includes: a base material layer 431 formed in a sheet; a prism layer 436 arranged on a face of the base material layer 431, the face to be the light guide plate side 21, that is, on the light input side face, functioning as an optical element layer; the optical functional layer 32 arranged on a face of the base material layer 431, the face being on the opposite side of the prism layer 436, that is, arranged on the light output side face; and the adhesive layer 35 arranged on the opposite side of the base material layer 431 of the optical functional layer.

As shown in FIGS. 13 and 14, in this embodiment, the base material layer 431 is a sheet-like member formed in a flat plate supporting the optical element layer 436 and the optical functional layer 32.

For the material of the base material layer 431, the same material of the base material layer 31 may be used.

In the optical element layer 436, a plurality of unit optical elements 437 are arrayed in a manner to be arrayed along the light input face side of the base material layer 431. More specifically, the unit optical element 437 is a column-shaped member formed in a manner to extend in the back-to-front direction of the drawing sheet of FIG. 14, having the cross section shown in FIG. 14. The extending direction of the unit optical element 437 is same as the extending directions of the back face optical element 23 and the light transmissive portion 33 of the optical functional layer 32, and is orthogonal to the light guiding direction of the light guide plate 21, in the front view of the optical sheet 430. Therefore, a plurality of unit optical elements 437 are arrayed in the light guiding direction.

The longitudinal direction, which is the direction where the ridge line of the unit optical element 437 extends, is orthogonal to the transmission axis of the lower polarizing plate 14 of the liquid crystal panel 15, when the display panel is observed from the front (in the front view). Preferably, the longitudinal direction of the unit optical element 437 of the optical sheet 430 intersects at an angle of more than 45° and less than 135°, to the transmission axis of the lower polarizing plate 14 of the liquid crystal panel 15, in the front view. The angle mentioned herein means a smaller angle of the angles made by the longitudinal direction of the unit prism 437 and the transmission axis of the lower polarizing plate 14, that is, an angle of no more than 180°. Particularly in this embodiment, the longitudinal direction of the unit optical element 437 of the optical sheet 430 is preferably orthogonal to the transmission axis of the lower polarizing plate 14 of the liquid crystal panel 15; and the arrangement direction of the unit optical elements 437 is preferably parallel to the transmission axis of the lower polarizing plate 14 of the liquid crystal panel 15.

Figure 15:
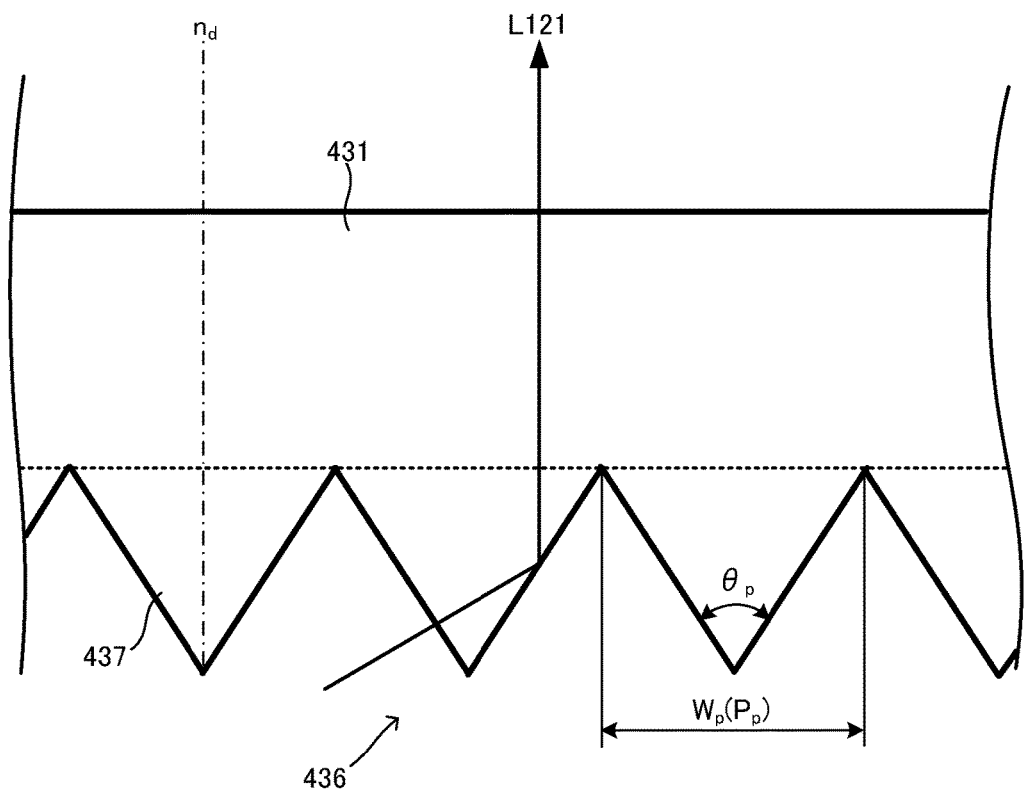
FIG. 15 is a view showing an optical element layer 436.

Next, the cross-sectional shape of the unit optical element 437 will be described. FIG. 15 is a partially enlarged view of the base material layer 431 and the optical element layer 436 shown in FIG. 13. Herein, "$d_d$" shows the normal direction of the layer face of the base material layer 431.

As is seen from FIG. 15, in this embodiment, the unit optical element 437 has an isosceles triangular cross section, in which the face of the light guide plate 21 side of the base material layer 431 is projecting. That is, the width of the unit optical element 437 in a direction parallel to the layer face of the base material layer 431 gets smaller as it gets farther from the base material layer 431 along the normal direction "$n_d$" of the base material layer 431. Therefore, the unit optical element 437 is an element convex to the light source 25 side in the image source unit 410.

In this embodiment, the outer contour of the unit optical element 437 forms a line symmetry with an axis parallel to the normal direction "$n_d$" of the base material layer 431 as a symmetrical axis; and the cross-sectional shape of the unit optical element 437 is an isosceles triangle. With this configuration, the brightness on the light output face of the optical sheet 430 can have a symmetrical angle distribution of brightness around the front direction, in the plane parallel to the arrangement direction of the unit optical element 437.

Here, the size of the unit optical element 437 is not particularly limited, and it is preferable that the vertex angle $\theta_p$ is in the range of from 50° to 80°, and the width $W_p$ of the base and the pitch $P_p$ are each in the range of from 10 μm to 100 μm.

In this embodiment, the unit optical element having the triangular-shaped cross section as above has been described; however, the cross-sectional shape of the unit optical element is not limited thereto. It may be a trapezoidal shape, changing the vertex part of the triangle into a shorter upper base. Further, the oblique line of the triangle may be a polygonal line or curved line. In addition, the unit optical element does not have to have a prism shape, and the oblique face may be a convex carved line or concave carved line.

The plurality of the unit optical elements may have a same cross-sectional shape, or may be arrayed to have different cross sectional shapes with regularities, for example, having a different cross sectional shapes in every other pitch.

For the material of the unit optical element, the same material as that of the base material layer may be applied. Here, the refractive index is preferably no less than 1.55, in view of having an efficient total reflection of light at the oblique face and directing the light to the observer side. However, if the refractive index is too high, the material easily gets cracked. Therefore, the refractive index is preferably no more than 1.61, and more preferably no more than 1.58.

Next, the optical functional layer 32 will be described back to FIGS. 13 and 14. The optical functional layer 32 in this embodiment is same as the optical functional layer 32 of the image source unit 10 described above, except its orientation. Therefore the explanation thereof is omitted.

In the optical sheet 430, the adhesive layer 35 is layered on a face of the optical functional layer 32, the face being opposite from the face where the base material layer 431 is arranged. This adhesive layer 35 is same as the adhesive layer 35 of the optical sheet 30.

As described above, the optical sheet 430 includes the optical element layer 436 and the optical functional layer 32. The optical element layer 436 includes the unit optical elements 437 arrayed in a manner to be convex to the opposite side from the optical functional layer 32, across the base material layer 431. Here, it is preferable that the extending direction of the unit optical element 437 and the extending direction of the light transmissive portion 33 and the light absorbing portion 34 of the optical functional layer 32 form an angle in the range of no more than 10° in the front view of the optical sheet 430. This makes it possible to efficiently control light, as described later.

In this embodiment, an example in which the optical element layer 436 and the optical functional layer 32 are arranged on either side of the base material layer 431 is shown. However, the present invention is not limited thereto, and each of the prism layer 436 and the optical functional layer 32 may separately have a base material layer, and the two base material layers may be attached to each other to form an optical sheet. When each of the optical element layer 436 and the optical functional layer 32 separately has a base material, the two base materials do not have to be attached to each other, and they may have a predetermined gap, or may just have contact with each other without being attached to each other. When the base materials are not attached to each other, a rough face similar to the rough face 31a described above may be provided thereto.

The light traveled through the light guide plate 21 and the light diffusion layer 26 and emitted from the prism layer 27 enters the optical sheet 430. The unit optical element 437 of the optical sheet 430 has a light condensing function (function to change the direction of light closer to the normal line of the liquid crystal panel), in which the light entered the unit optical element 437 is totally reflected at the opposite face of the face where the light entered, and changes its direction. That is, as shown by L121 in FIG. 15, the light having entered the unit optical element 437 is totally reflected at the interface between the unit optical element 437 and air, based on their refractive index difference. The oblique side of the unit optical element 437 is inclined by $\theta_p/2$ to the normal direction $n_d$ of the sheet face (same as the normal line of the liquid crystal panel). Therefore, the reflection light at the interface has an angle to be closer to the normal line $n_d$ than the light having entered the unit optical element 437.

Thus, at the face parallel to the arrangement direction of the unit optical elements 437 of the optical sheet 430, the optical element layer 436 can concentrate the moving direction of the transmitted light into a narrow angle range around the front direction side. Therefore, the brightness in the front direction can be increased by the optical function of the optical sheet 430.

As described, the optical element layer 436, which has the unit optical element 437 convex to the light input side, can efficiently concentrate light without having side lobe. After that, the light passes through the optical functional layer 32, the liquid crystal panel 15, and the functional sheet 40, and then is provided to the observer.

The optical sheet 430 described above efficiently condenses the light from the light guide plate 21, and light not condensed is absorbed by the light absorbing portion. Therefore the optical sheet 430 can efficiently provide proper light to the liquid crystal panel, and can greatly improve the use efficiency of light.

Figure 16:
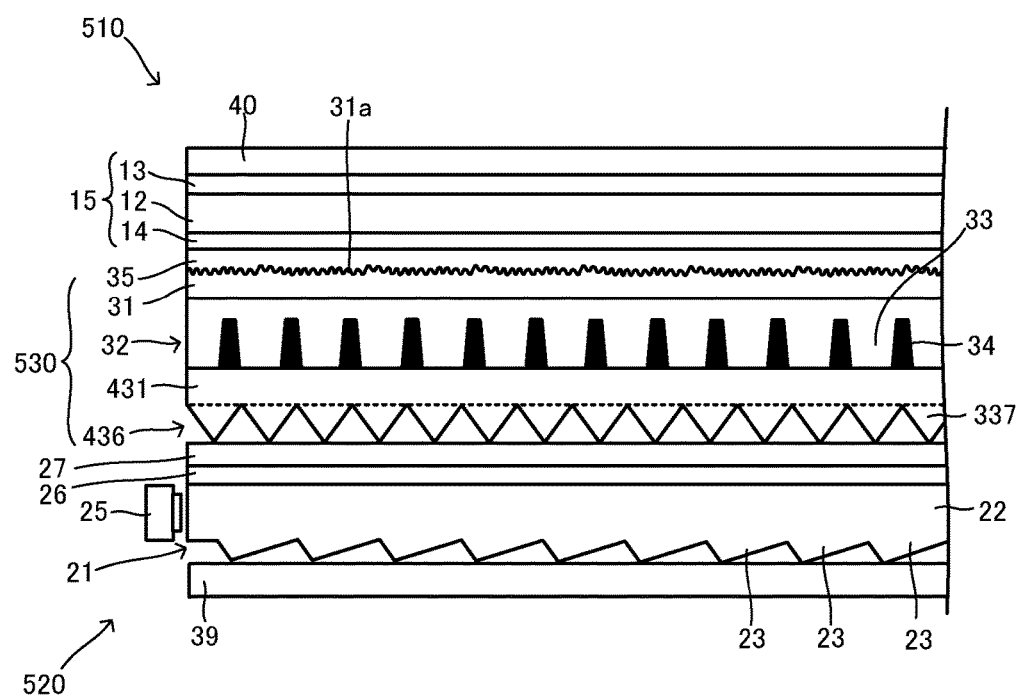
FIG. 16 is a cross-sectional view of an image source unit 510.

FIG. 16 is a view showing a sixth embodiment, and corresponds to FIG. 2. In this embodiment, an optical sheet 530 is applied to a surface light source device 520 of an image source unit 510. Other structure is same as the above-described image source units 10 and 410.

The optical sheet 530 includes the base material layer 431 and the optical element layer 436, in the same manner as in the optical sheet 430. However, the layer structure in a side closer to the liquid crystal panel 15 than the base material layer 431 is same as that of the optical sheet 30 of the image source unit 10. The reflection type polarizing plates 28, 28' may be arranged between the base material layer 431 and the optical functional layer 32.

The image source unit 510 like this exerts the same effect as the effect described above.

Based on the optical sheets described above, optical sheets having the following layer structures were produced as Examination Examples 3 to 8.

Examination Example 3

From the observer side, layered were an adhesive layer, a base material layer for an optical functional layer, the optical functional layer (optical functional layer whose orientation was same as in the example in FIG. 16), a reflection type polarizing plate, a base material layer for an optical element layer, and the optical element layer.

Examination Example 4

From the observer side, layered were the adhesive layer 35, an optical functional layer (optical functional layer whose orientation was same as in the example in FIG. 14), a base material layer for the optical functional layer, a reflection type polarizing plate, a base material layer for an optical element layer, and the optical element layer.

Examination Example 5

From the observer side, layered were the adhesive layer 35, a base material layer for an optical functional layer, the optical functional layer (optical functional layer whose orientation was same as in the example in FIG. 16), a base material layer for an optical element layer, and the optical element layer.

Examination Example 6

From the observer side, layered were an adhesive layer, an optical functional layer (optical functional layer whose orientation was same as in the example in FIG. 14), a base material layer, and a optical element layer.

Examination Example 7

Figure 17:
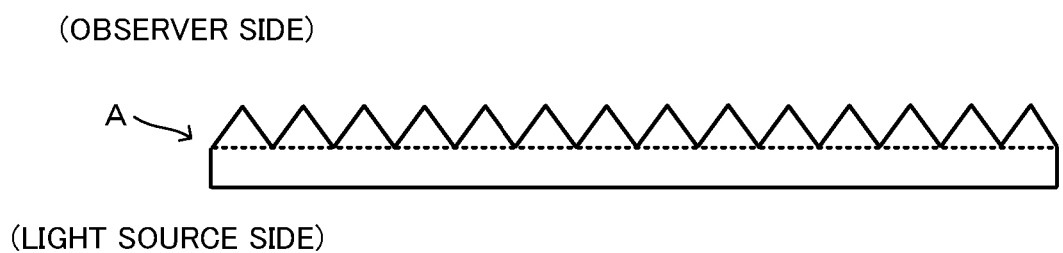
FIG. 17 is a view showing a prism sheet A.

From the observer side, layered were an adhesive layer, a base material layer for an optical functional layer, the optical functional layer (optical functional layer whose orientation was same as in the example in FIG. 16), a reflection type polarizing plate, the prism sheet A having a layer of prism shape convex to the observer side as shown in FIG. 17 (vertex angle of the prism: 90°), and a light diffusing film.

Examination Example 8

From the observer side, layered were an adhesive layer, an optical functional layer (optical functional layer whose orientation was same as in the example in FIG. 14), a base material layer for the optical functional layer, a reflection type polarizing plate, the prism sheet A having a layer of prism shape convex to the observer side as shown in FIG. 17 (vertex angle of the prism: 90°), and a light diffusing film.

Here, specific shape in each example was as follows.
(Unit Optical Element)
pitch: 50 μm (see $P_p$ in FIG. 15)
vertex angle: 70° (see $\theta_p$ in FIG. 15)
material and refractive index: ultraviolet curing urethane acrylate, refractive index 1.58
base material layer: polycarbonate, thickness 130 μm
(Optical Functional Layer)
pitch: 39 μm (see $P_k$ in FIG. 7)
width of upper base of light absorbing portion: 4 μm (see $W_a$ in FIG. 7)
width of lower base of light absorbing portion: 10 μm (see $W_b$ in FIG. 7)
thickness of light absorbing portion: 102 μm (see $D_k$ in FIG. 7)
thickness of optical functional layer: 127 μm
material and refraction ratio of light transmissive portion: ultraviolet curing urethane acrylate, refractive index 1.56
material and refraction ratio of light absorbing portion: ultraviolet curing urethane acrylate whose refractive index 1.49, with 25 mass % of acrylic beads containing carbon black, dispersed in the ultraviolet curing urethane acrylate On the back face side of the optical sheet of each Examination Example, a light guide plate, a reflection sheet, and a light source were arranged as in the example in FIG. 14. The optical sheet was irradiated from the back face side with the edge light type light source with the light guide plate. A liquid crystal panel (6.5 inch, LQ065T5GG03, manufactured by SHARP CORPORATION) was arranged on the light output side of the optical sheet. The brightness was measured from the front (by luminance meter, LS-110, manufactured by Konica Minolta, Inc.).

In addition, the inclined angle (half-value angle) at which the value of brightness is half of the front brightness was measured. As to the half-value angle, the average of the upper side and lower side (direction in which the light transmissive portions were arrayed) seen from the front was taken.

TABLE 2

|            | Front brightness | Half-value angle |
|------------|------------------|------------------|
| Exam. Ex. 3 | 145%            | 60°              |
| Exam. Ex. 4 | 139%            | 60°              |
| Exam. Ex. 5 | 137%            | 45°              |
| Exam. Ex. 6 | 130%            | 45°              |
| Exam. Ex. 7 | 80%             | 50°              |
| Exam. Ex. 8 | 76%             | 50°              |

As is seen from Table 2, in Examination Examples 3 to 6, the front brightness was able to be increased more, compared to the front brightness in Examination Examples 7 and 8.

REFERENCES SIGN LIST 10, 310, 410, 510 image source unit
15 liquid crystal panel
20, 320, 420 surface light source device
21 light guide plate
25 light source
26 light diffusion layer
27 prism layer
28 reflection type polarizing plate
30, 130, 230, 330, 430 optical sheet
32 optical functional layer
33 light transmissive portion
34 light absorbing portion (in-between portion)

What is claimed is:

1. An image source unit comprising:
a liquid crystal panel including a lower polarizing plate, an upper polarizing plate, and a liquid crystal layer arranged between the lower polarizing plate and the upper polarizing plate; and
an optical sheet arranged on the lower polarizing plate side from the liquid crystal panel; and
an optical element layer arranged on an opposite side of the optical sheet from the lower polarizing plate, the optical element layer including a plurality of unit optical elements each having a cross-section convex to the opposite side from the optical sheet side and having one extending direction keeping the cross-section, the optical elements being arrayed in a direction different from the extending direction,
wherein the optical sheet includes a base material layer, an optical functional layer arranged on one face of the base material layer;
the optical functional layer includes a plurality of light transmissive portions having one extending direction along a face of the base material layer and having a predetermined cross section, arrayed in a direction different from the extending direction at predetermined intervals, and at least one in-between portion formed in each of the intervals of the adjacent light transmissive portions;
and
an angle formed by an extending direction of a transmission axis of the lower polarizing plate and the extending direction of the light transmissive portions is 1° to 41.7° in a front view of the liquid crystal panel.

2. The image source unit according to claim 1, wherein the optical sheet includes a light diffuser between the optical functional layer and the lower polarizing plate.

3. The image source unit according to claim 2, wherein a rough face is provided on a face of the base material layer, the face being on the lower polarizing plate side of the base material layer.

4. The image source unit according to claim 1, wherein an angle formed by an extending direction of a transmission axis of the lower polarizing plate and the extending direction of the light transmissive portions is 1° to 20° in a front view of the liquid crystal panel.

5. The image source unit according to claim 1 further comprising a reflection type polarizing plate between the optical sheet and the optical element layer,
wherein an angle formed by an extending direction of a transmission axis of the reflection type polarizing plate and the extending direction of the light transmissive portions is no more than 41.7° in a front view of the liquid crystal panel.

6. The image source unit according to claim 1 further comprising a reflection type polarizing plate between the optical sheet and the optical element layer, wherein
an angle formed by an extending direction of a transmission axis of the reflection type polarizing plate and the extending direction of the light transmissive portions is 1° to 20° in a front view of the liquid crystal panel.

7. The image source unit according to claim 1, wherein the light transmissive portions each have a trapezoid cross section, and at the cross section, a lower base which is longer than an upper base faces to the liquid crystal panel side, and the upper base which is shorter than the lower base faces to the optical element layer side.

8. A display device in which the image source unit according to claim 1 is placed in a housing.

9. The image source unit according to claim 1, wherein an angle formed by the extending direction of the light transmissive portions and the extending direction of the unit optical elements is no more than 10° in a front view of the optical sheet.

10. The image source unit according to claim 1, wherein a refractive index of the in-between portion(s) is smaller than a refractive index of the light transmissive portions.

11. The image source unit according to claim 11, wherein a layer which reflects light is formed in the in-between portion(s), at interfaces between the in-between portion(s) and the light transmissive portions.

12. The image source unit according to claim 1, wherein a light-absorbing material is contained in the in-between portion(s).

13. The image source unit according to claim 1, further comprising a light source arranged on a side to which the unit optical elements of the optical element layer of the optical sheet are convex.

14. A layered body comprising:
a polarizing plate;
an optical sheet arranged on one face side of the polarizing plate; and
an optical element layer arranged on an opposite side of the optical sheet from the polarizing plate, including a plurality of unit optical elements each having a cross-section convex to the opposite side from the optical sheet side and having one extending direction keeping the cross-section, the optical elements being arrayed in a direction different from the extending direction;
wherein the optical sheet includes a base material layer, an optical functional layer arranged on one face of the base material layer; the optical functional layer includes a plurality of light transmissive portions having one extending direction along a face of the base material layer and having a predetermined cross section, arrayed in a direction different from the extending direction at predetermined intervals, and an in-between portion(s) formed in each of the intervals of the adjacent light transmissive portions;

and an angle formed by an extending direction of a transmission axis of the polarizing plate and the extending direction of the light transmissive portions is 1° to 41.7° in a front view of the layered body.

15. A layered body comprising:

a reflection type polarizing plate;

an optical sheet arranged on one face side of the reflection type polarizing plate; and an optical element layer arranged on another face side of the reflection type polarizing plate, including a plurality of unit optical elements each having a cross-section convex to a side opposite the reflection type polarizing plate and having one extending direction keeping the cross-section, the optical elements being arrayed in a direction different from the extending direction;

wherein the optical sheet includes a base material layer, an optical functional layer arranged on one face of the base material layer; the optical functional layer includes a plurality of light transmissive portions having one extending direction along a face of the base material layer and having a predetermined cross section, arrayed in a direction different from the extending direction at predetermined intervals, and an in-between portion(s) formed in each of the intervals of the adjacent light transmissive portions;

and an angle formed by an extending direction of a transmission axis of the reflection type polarizing plate and the extending direction of the light transmissive portions is 1° to 41.7° in a front view of the layered body.

* * * * *